April 17, 1962 W. A. GUSSOW ET AL 3,030,481

SWITCH CONSTRUCTION

Filed Dec. 23, 1957 23 Sheets-Sheet 1

INVENTORS.
William A. Gussow,
John J. Mikos,
BY
Robert R. Lockwood

INVENTORS.
William A. Gussow,
John J. Mikos,
BY Robert R. Lockwood
Atty.

SWITCH CONSTRUCTION

Filed Dec. 23, 1957 23 Sheets-Sheet 3

INVENTORS
William A. Gussow,
John J. Mikos,
BY Robert R. Lockwood
Atty

INVENTORS.
William A. Gussow,
BY John J. Mikos,
Robert R. Lockwood
Atty.

INVENTORS.
William A. Gussow,
John J. Mikos,
BY Robert R. Lockwood
Atty

April 17, 1962 W. A. GUSSOW ET AL 3,030,481

SWITCH CONSTRUCTION

Filed Dec. 23, 1957 23 Sheets-Sheet 6

INVENTORS
William A. Gussow,
John J. Mikos,
BY Robert R. Lockwood
Atty

INVENTORS.
William A. Gussow,
John J. Mikos,
BY Robert R. Lockwood
Atty.

INVENTORS.
William A. Gussow,
John J. Mikos,
BY Robert R. Lockwood
atty.

INVENTORS.
William A. Gussow,
BY John J. Mikos,
Robert R. Lockwood
atty.

April 17, 1962 W. A. GUSSOW ET AL 3,030,481
SWITCH CONSTRUCTION
Filed Dec. 23, 1957 23 Sheets-Sheet 10
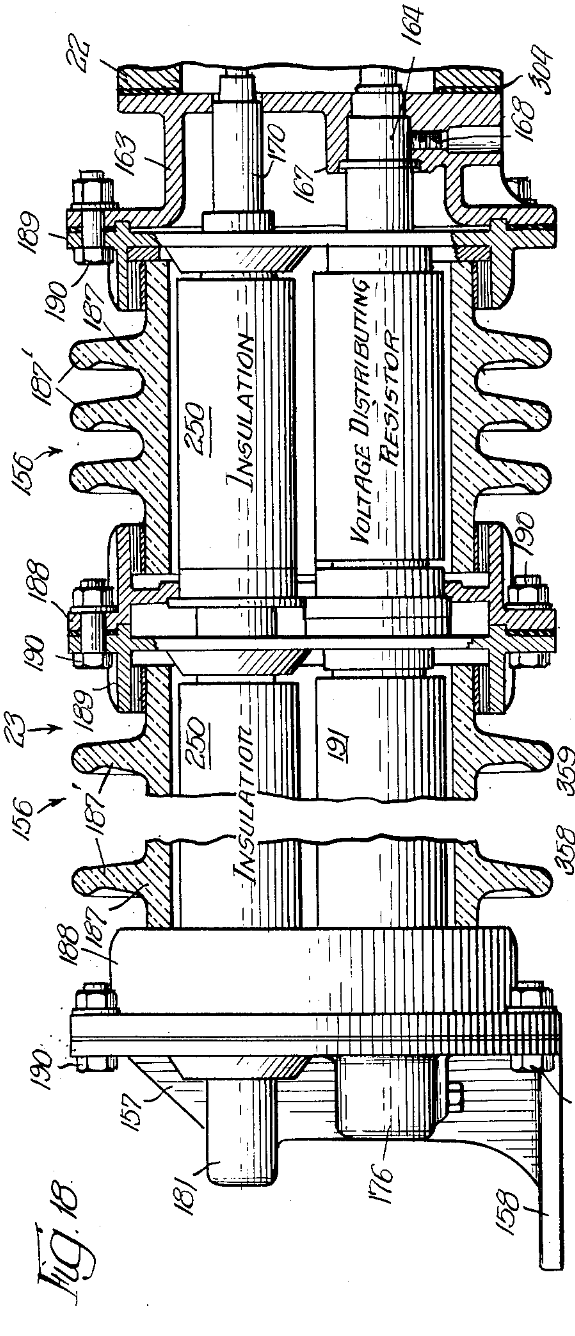
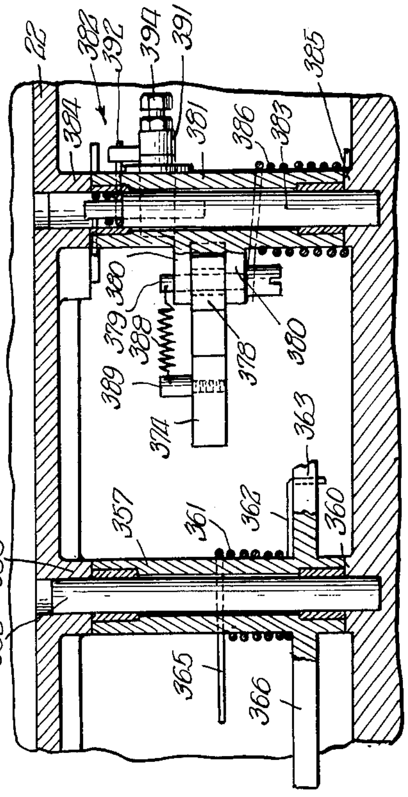
Fig. 36
INVENTORS.
William A. Gussow,
BY John J. Mikos,
Robert R. Lockwood
Atty April 17, 1962 W. A. GUSSOW ET AL 3,030,481

SWITCH CONSTRUCTION

Filed Dec. 23, 1957 23 Sheets-Sheet 11

INVENTORS.
William A. Gussow
BY John J. Mikos,
Robert R. Lockwood
Atty.

INVENTORS
William A. Gussow,
BY John J. Mikos,
Robert R. Lockwood
Atty

INVENTORS
William A. Gussow,
John J. Mikos,
BY Robert R. Lockwood
Atty

INVENTORS.
William A. Gussow,
John J. Mikos,
BY Robert R. Lockwood
Attys

April 17, 1962 W. A. GUSSOW ET AL 3,030,481

SWITCH CONSTRUCTION

Filed Dec. 23, 1957 23 Sheets-Sheet 15

INVENTORS
William A. Gussow,
BY John J. Mikos,
Robert R. Lockwood
atty

SWITCH CONSTRUCTION

Filed Dec. 23, 1957

INVENTORS.
William A. Gussow,
BY John J. Mikos,
Robert R. Lockwood
Atty.

April 17, 1962 W. A. GUSSOW ET AL 3,030,481

SWITCH CONSTRUCTION

Filed Dec. 23, 1957 23 Sheets-Sheet 17

INVENTORS.
William A. Gussow,
BY John J. Mikos,
Robert R. Lockwood
Atty

INVENTORS.
William A. Gussow,
John J. Mikos,
By Robert R. Lockwood
Atty

April 17, 1962 W. A. GUSSOW ET AL 3,030,481

SWITCH CONSTRUCTION

Filed Dec. 23, 1957 23 Sheets-Sheet 19

INVENTORS
William A. Gussow,
John J. Mikos,
By Robert R. Lockwood
atty

INVENTORS.
By William A. Gussow,
John J. Mikos,
Robert R. Lockwood
atty.

April 17, 1962 W. A. GUSSOW ET AL 3,030,481

SWITCH CONSTRUCTION

Filed Dec. 23, 1957 23 Sheets-Sheet 21

INVENTORS
William A. Gussow,
John J. Mikos,
BY Robert R. Lockwood
Atty

April 17, 1962 — W. A. GUSSOW ET AL — 3,030,481

SWITCH CONSTRUCTION

Filed Dec. 23, 1957 — 23 Sheets-Sheet 22

INVENTORS.
William A. Gussow
John J. Mikos,
BY Robert R. Lockwood
atty

INVENTORS.
William A. Gussow,
John J. Mikos,
BY Robert R. Lockwood
atty

United States Patent Office 3,030,481
Patented Apr. 17, 1962

3,030,481
SWITCH CONSTRUCTION

William A. Gussow, Chicago, and John J. Mikos, Highland Park, Ill., assignors to S & C Electric Company, Chicago, Ill., a corporation of Delaware Filed Dec. 23, 1957, Ser. No. 704,397
24 Claims. (Cl. 200—146)

This invention relates, generally, to high voltage circuit interrupters and it has particular relation to load break disconnecting switches.

Among the objects of this invention are: To provide for sequentially opening and closing a disconnecting switch blade and load interrupter contacts in a new and improved manner; to open the load interrupter contacts, then move the switch blade to open position and, during the final portion of its opening movement, reclose the load interrupter contacts and recock the spring mechanism that biases the load interrupter contacts to open position; to close the switch blade while the load interrupter contacts remain closed and their operating spring mechanism cocked; to require that the switch blade be moved to full open position and the load interrupter contacts opened after movement of the switch blade from fully closed position through a predetermined extent; to arrange arcing horns with respect to a cooperating arcing tip on the switch blade in such manner as to permit ready separation thereof should they become encased in ice; to employ parallel arranged series connected main and auxiliary contact means for the load interrupter contacts and to open the main contact means first and thereafter the auxiliary contact means; to provide for distributing the voltage across the series connected contact means in open position thereof; to employ for the main contact means relatively heavy contacts capable of continuously carrying load current and withstanding the flow of short circuit current and for the auxiliary contact means employing relatively light weight contacts the movable portion of which can be accelerated rapidly to quickly open the circuit; to secure the relatively heavy movable contacts to an insulating operating member in such manner as not to be adversely affected by heat generated by flow of excess current, such as high momentary overloads or short circuits; to vent the arc products resulting from separation of the auxiliary contacts to the atmosphere and to seal the remaining parts of the current interrupter against contamination by such arc products; to provide a construction for the main and auxiliary contacts such that the magnetic forces generated by current flow tend to increase the contact pressure as a function of the current flow; to insure opening of the separable contacts through the agency of mechanical pry out means acting in conjunction with the spring mechanism which biases them to the open position; to latch the load interrupter contacts in the closed position against the opening action of the spring and to provide for tripping the latch on reverse movement of the switch blade during closing movement thereof at a plurality of different positions in the vicinity of its fully closed position; to provide for prying open the separable contacts of the load interrupter for each of the positions of the switch blade in which its closing movement can be reversed; to provide arc extinguishing means for the auxiliary contact means; to employ three insulators with a line contact on one, a line terminal on another and a metallic mechanism housing on the intermediate insulator which carries the switch blade and one end of the load interrupter; to rotate the intermediate insulator for swinging the switch blade and operating the load interrupter in predetermined sequence; to bias the switch blade by a counter balancing spring toward the open position; to bias the main contact means of the load interrupter to the open position by a spring interposed between the mechanism housing and a main operating arm; to bias the auxiliary contact means of the load interrupter to the open position by an auxiliary spring interposed between the main operating arm and an auxiliary operating arm; to employ the kinetic energy of the main contact means and a portion of the biasing action of the spring operating the same to move the auxiliary contact means to open position; to wind up the spring on the reverse movement of the main and auxiliary operating arms during the rotation of the intermediate insulator in completing opening movement of the switch blade; to apply the operating torque through a single shaft for opening and closing the switch blade and load interrupter; to enclose the main and auxiliary contact means within an insulating housing which extends between the line terminal and the mechanism housing and holds the latter against rotation; to provide a load interrupter construction in which the number of unenclosed moving parts subject to being encased by ice is reduced to a minimum.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which is set forth in the appended claims.

For a more complete understanding of the nature and scope of this invention reference can be had to the following detailed description, taken together with the accompanying drawings, in which:

FIGURE 1 is a top plan view showing how the switch means of the present invention can be installed for overhead upright mounting on the frame structure, only one pole of the switch being illustrated with the supports for two others being shown for a typical three phase installation, the mechanism being shown in the position that it occupies when the disconnecting switch blade is closed and the load current interrupter is closed;

FIGURE 18 is a longitudinal vertical sectional view of the load interrupter unit, the insulating bushings or housings therefor being shown in section while the circuit interrupter units are shown in elevation;

Figure 19:
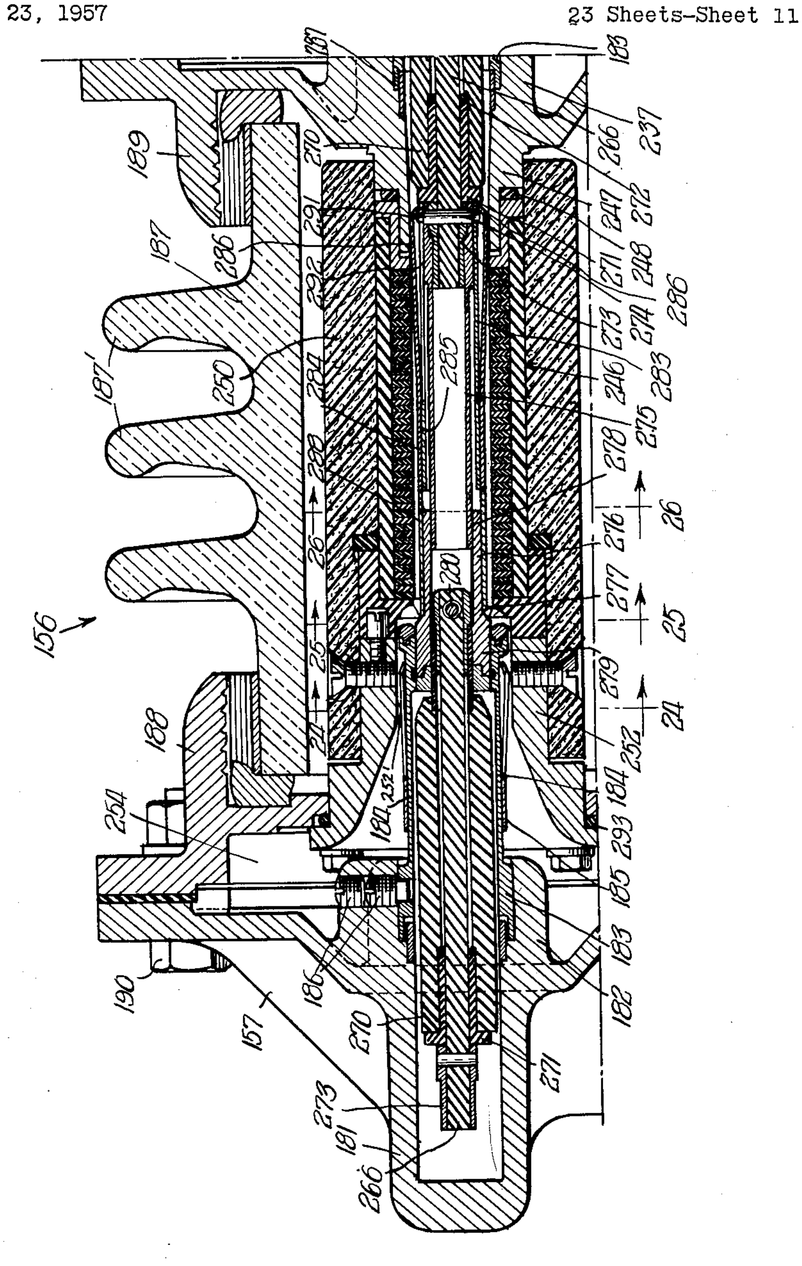
Figure 20:
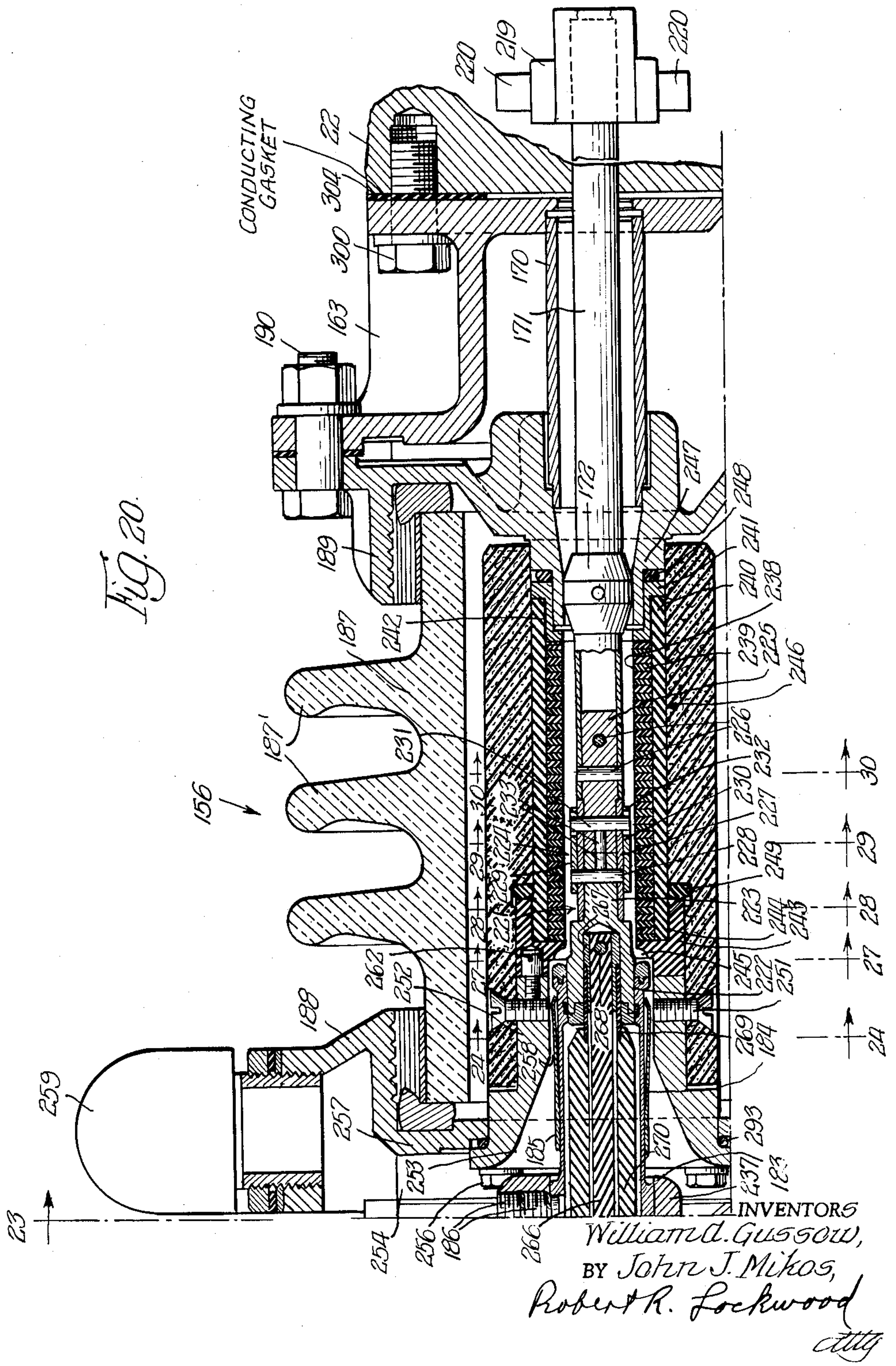
Figure 21:
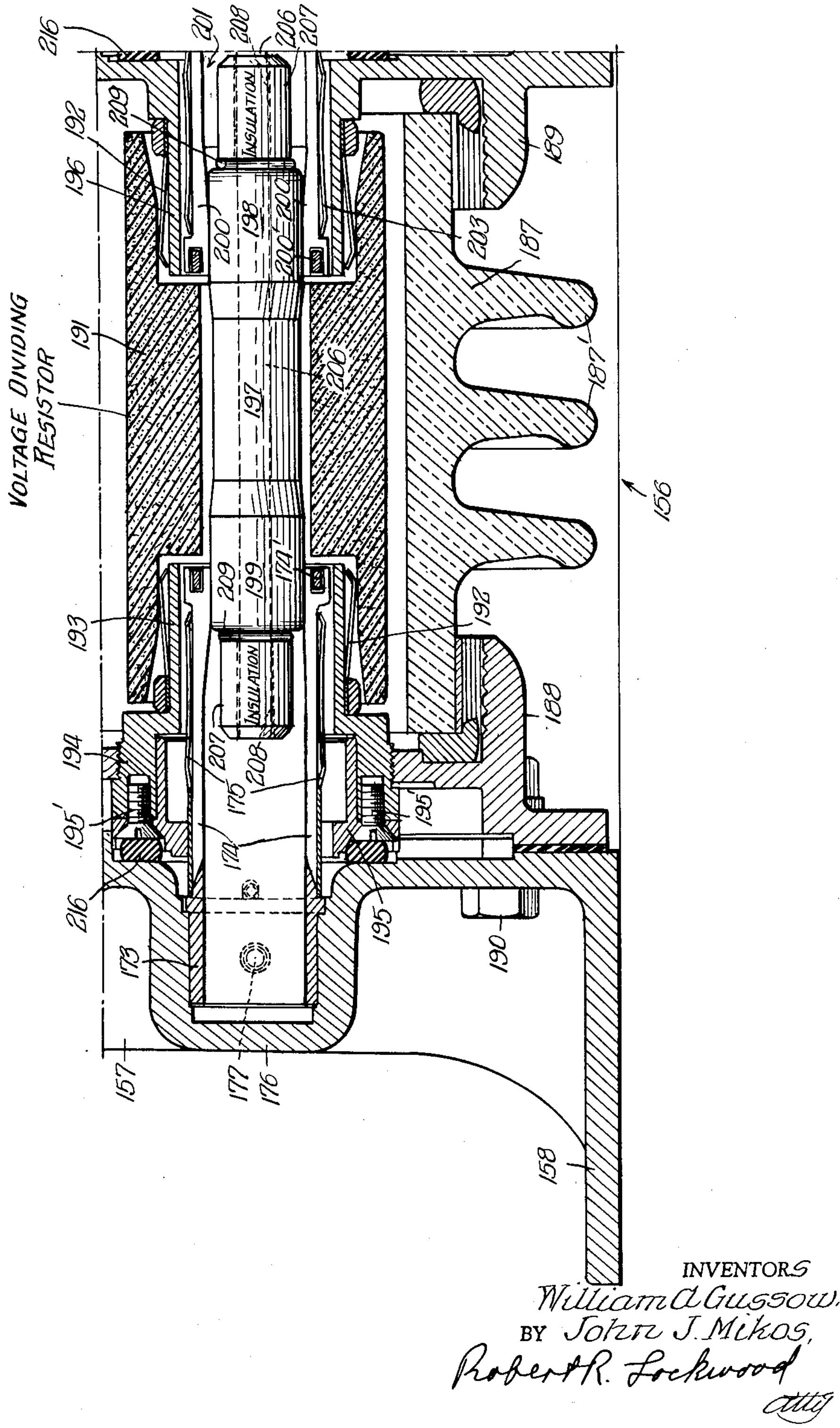
Figure 22:
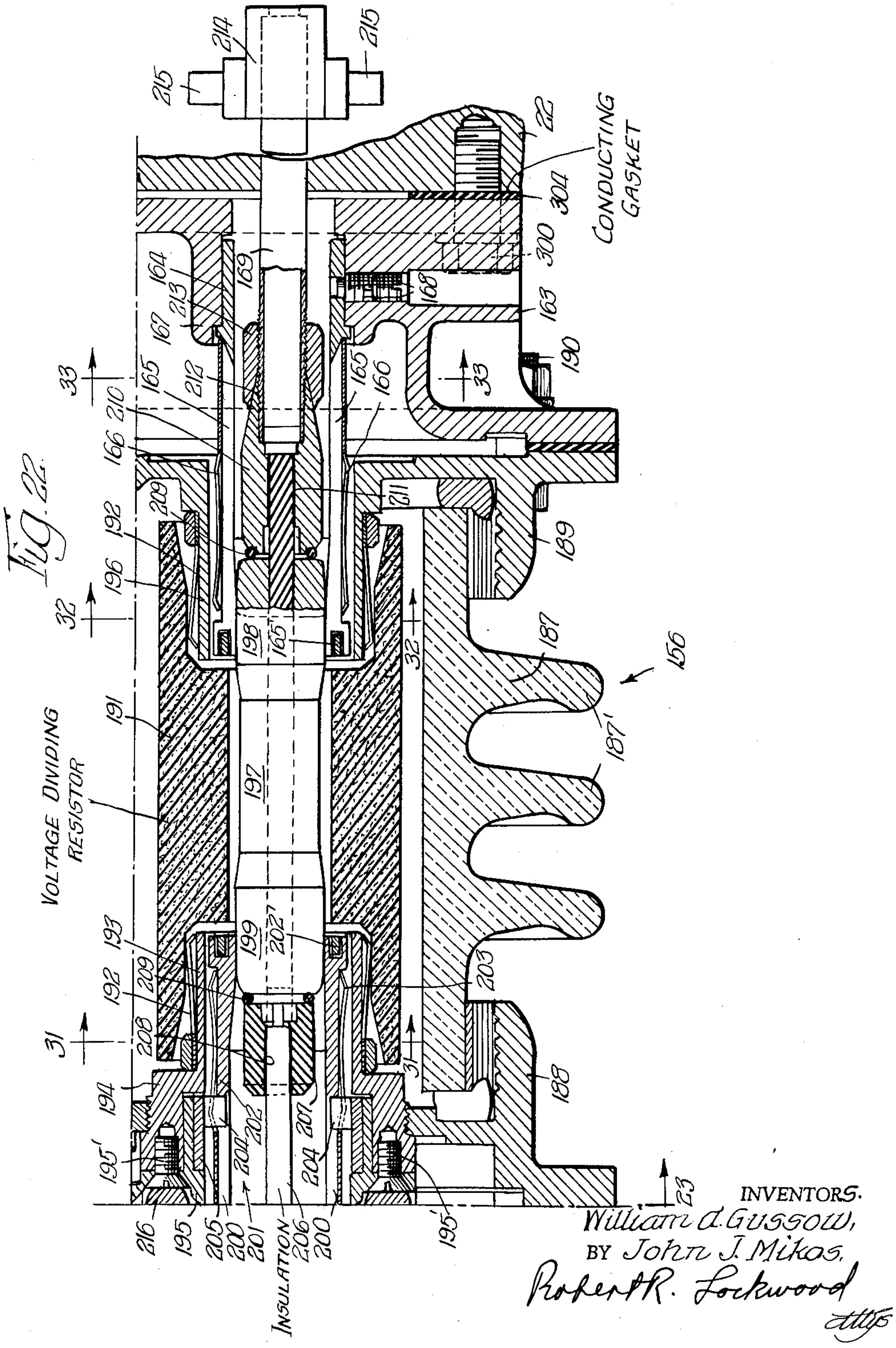
Figure 23:
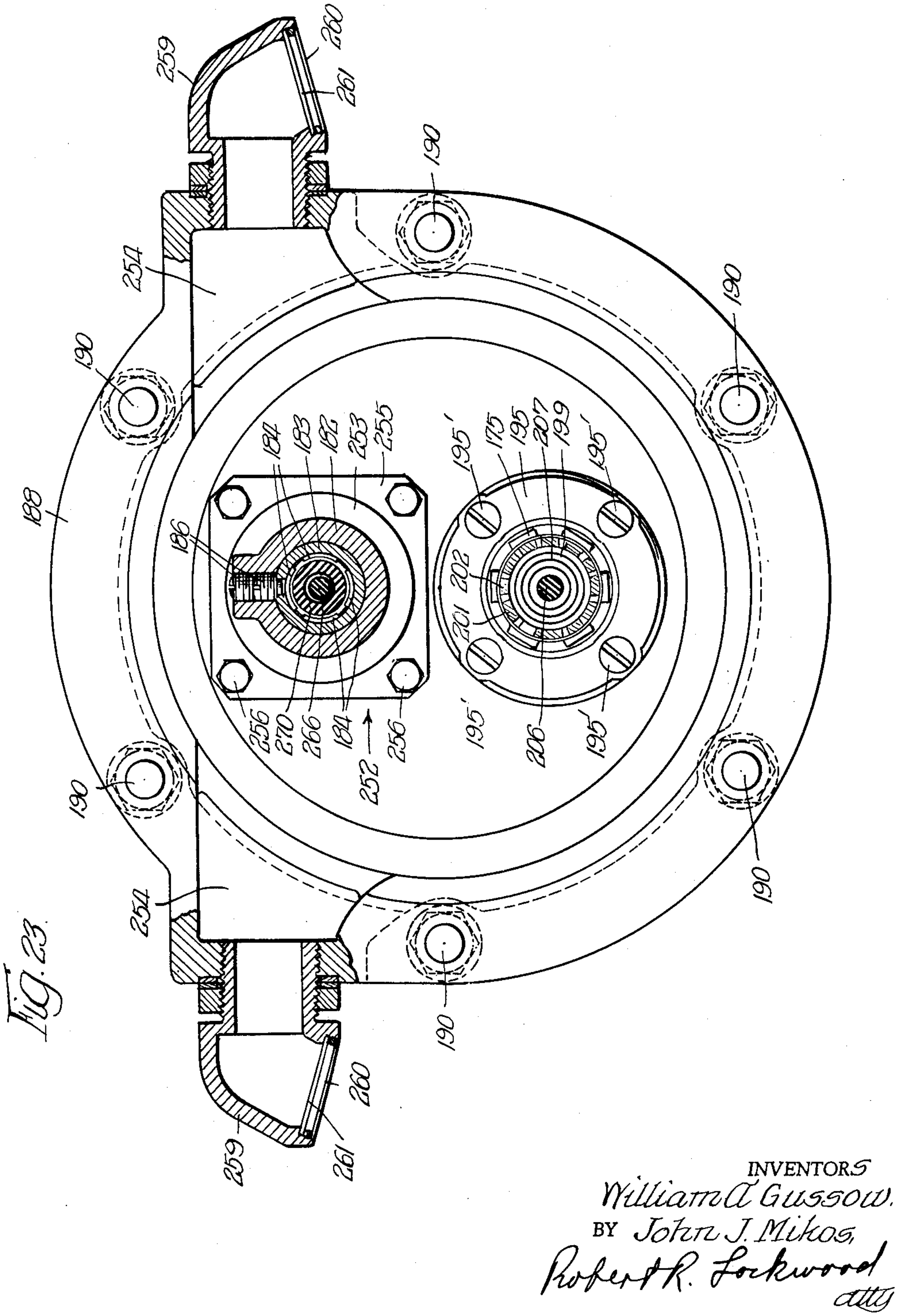
Figures 24, 25, 26, 27, 28:
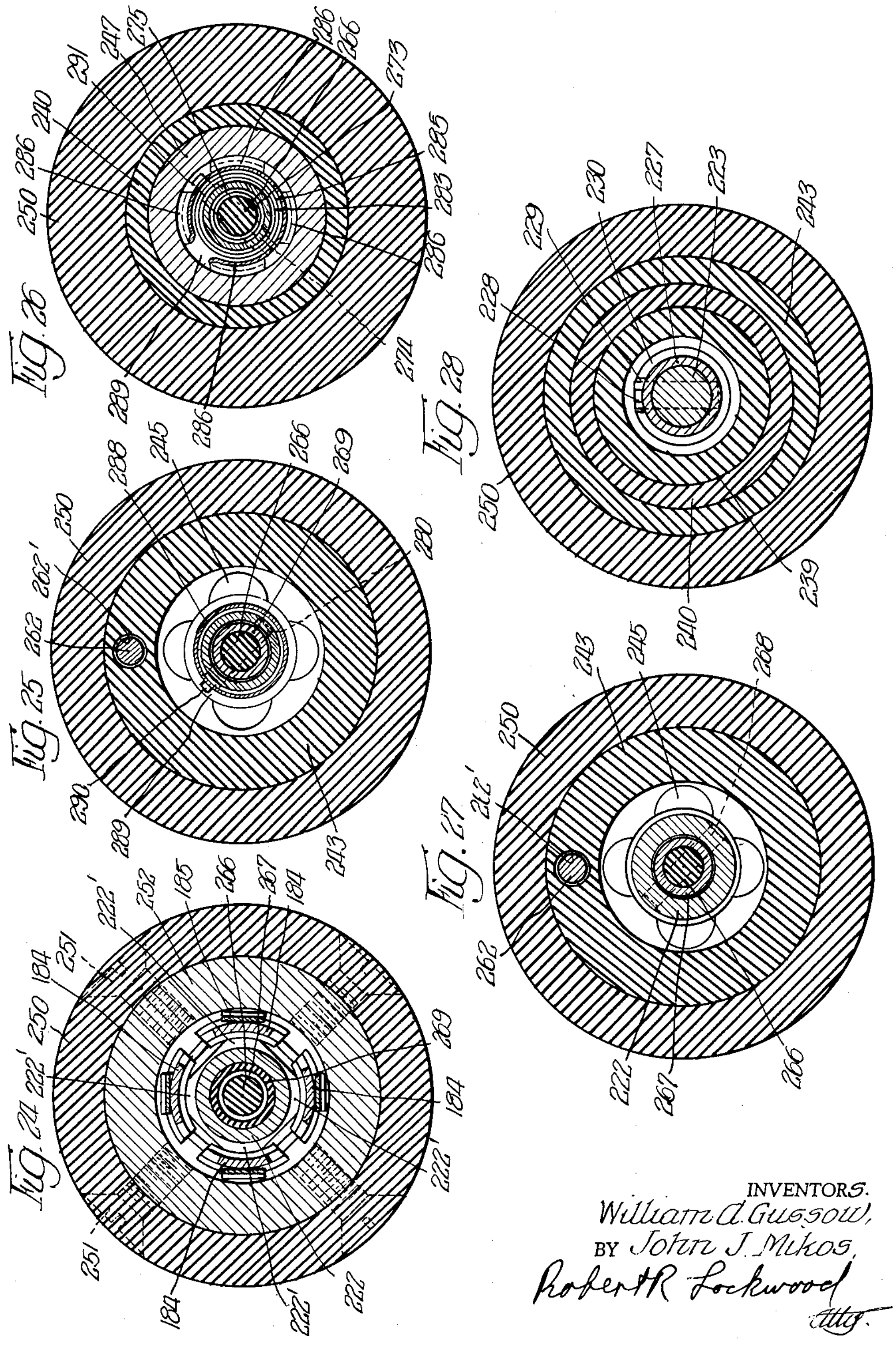
Figures 29, 30, 31, 32, 33:
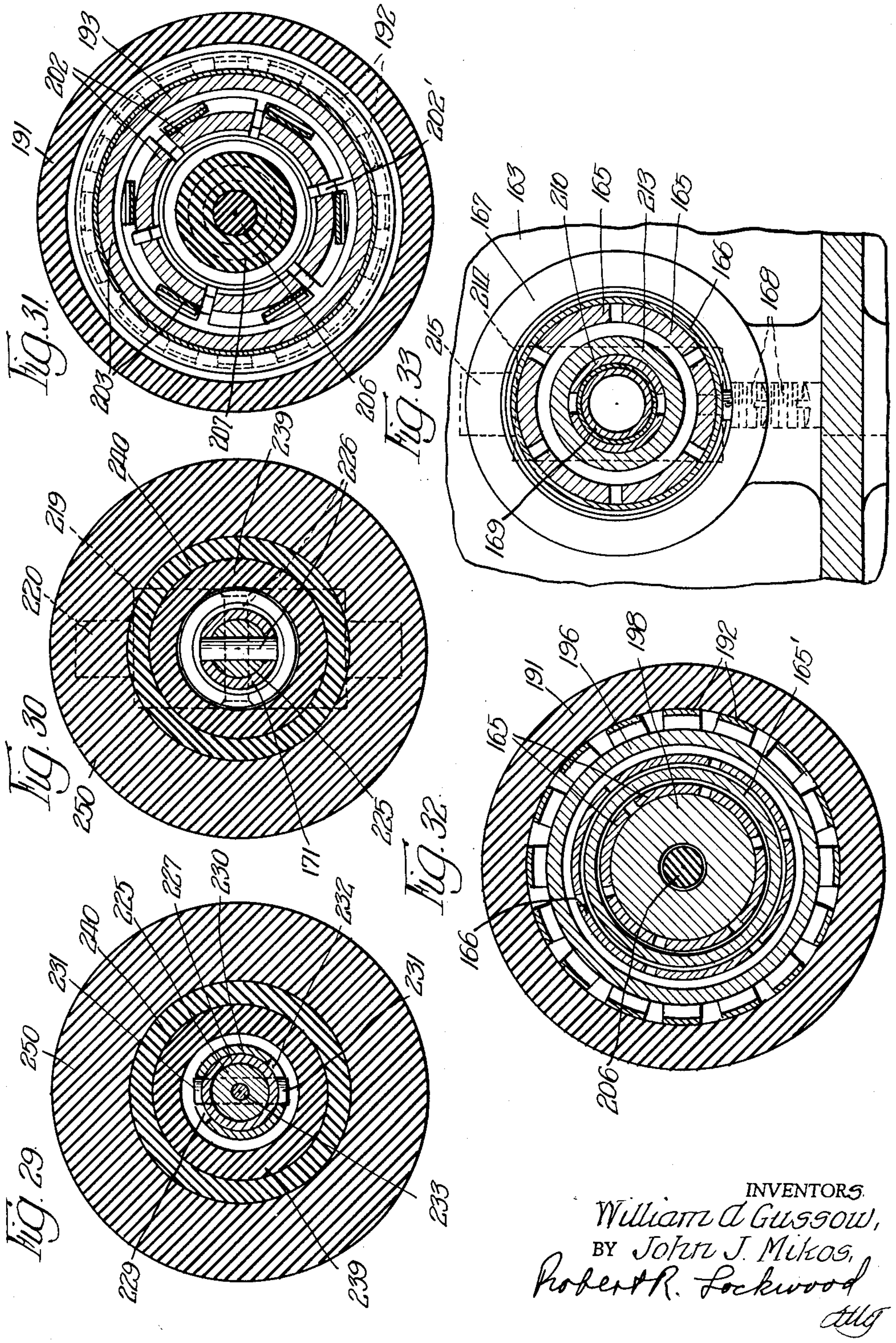
Figure 34:
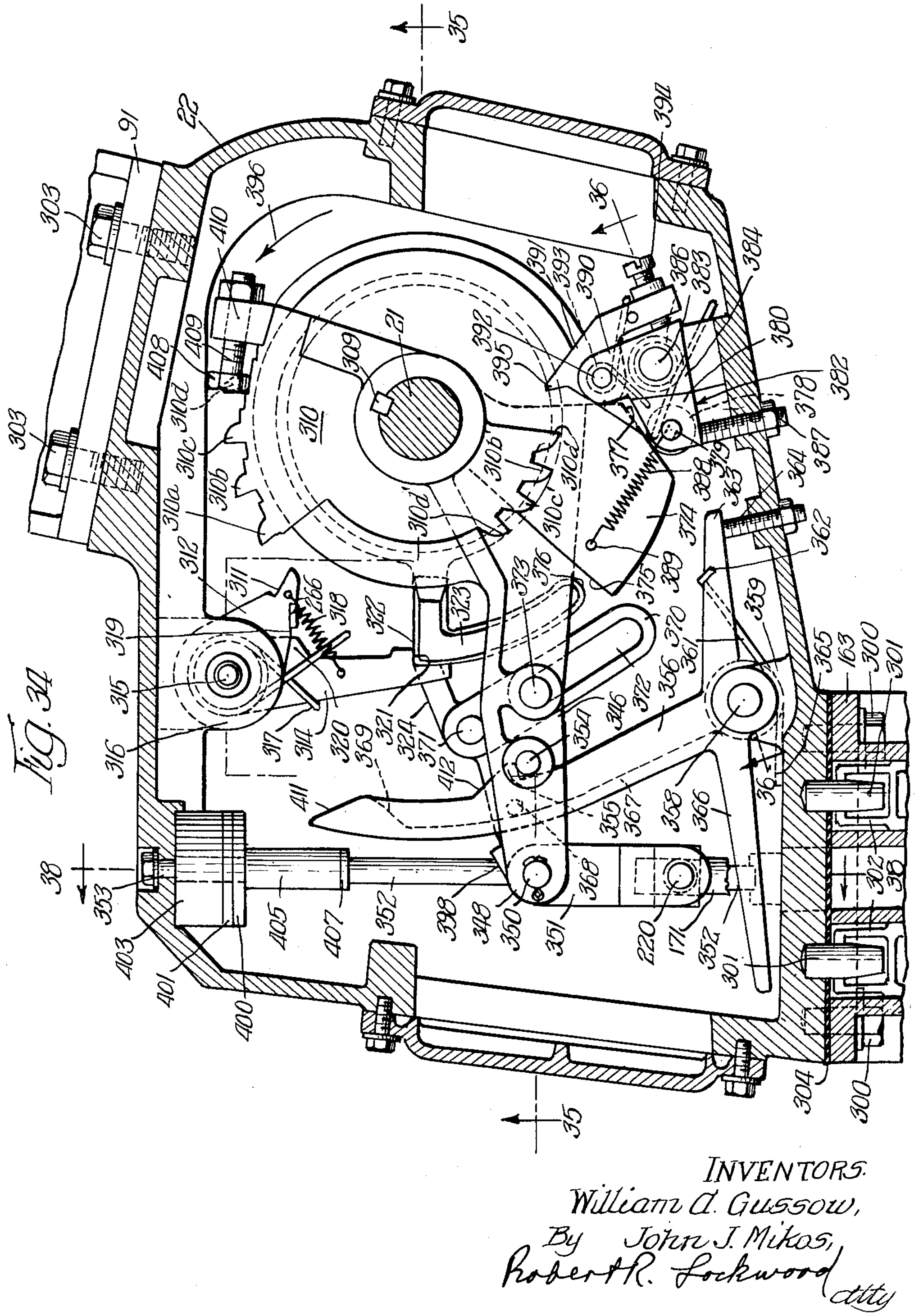
Figure 35:
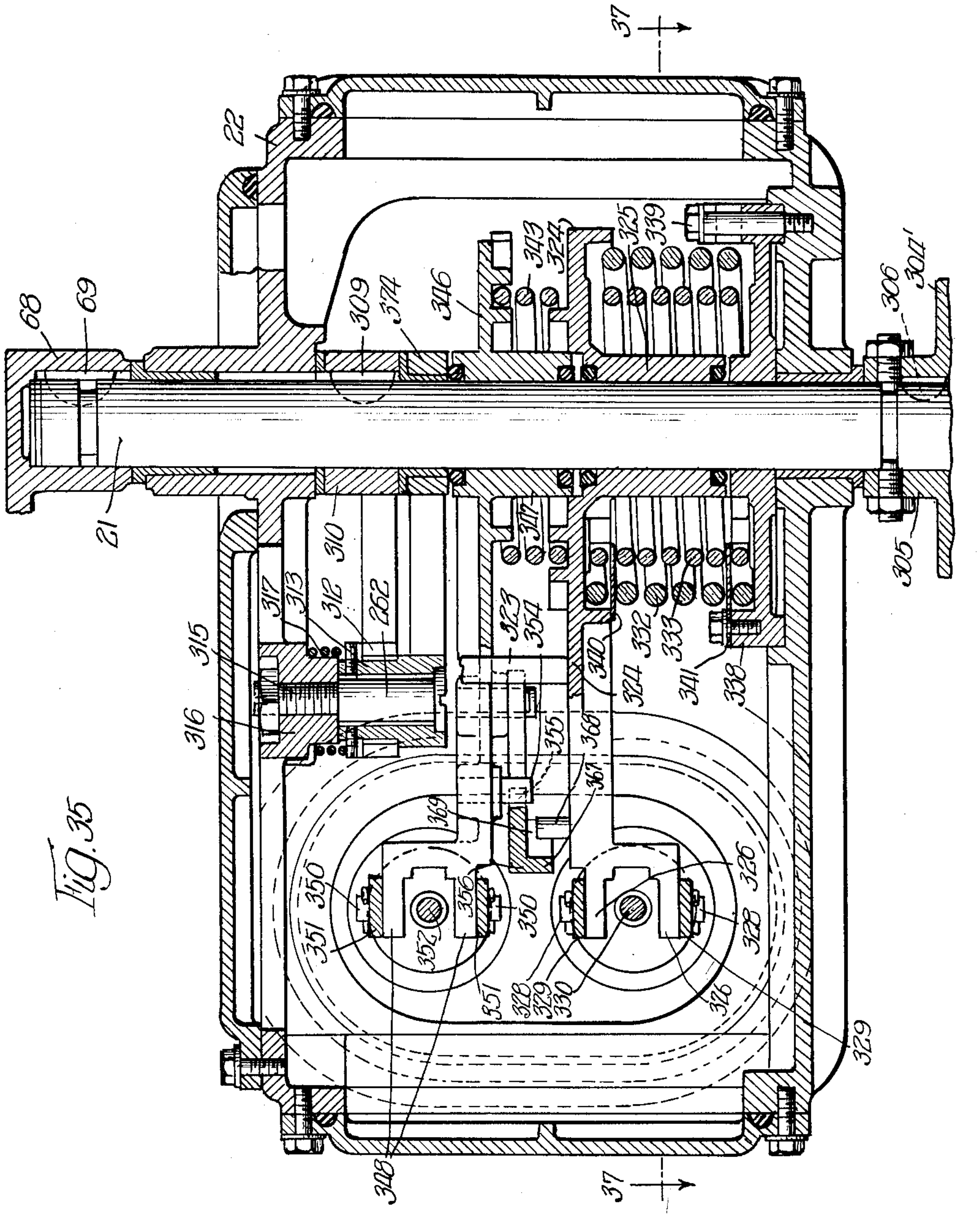
Figure 37:
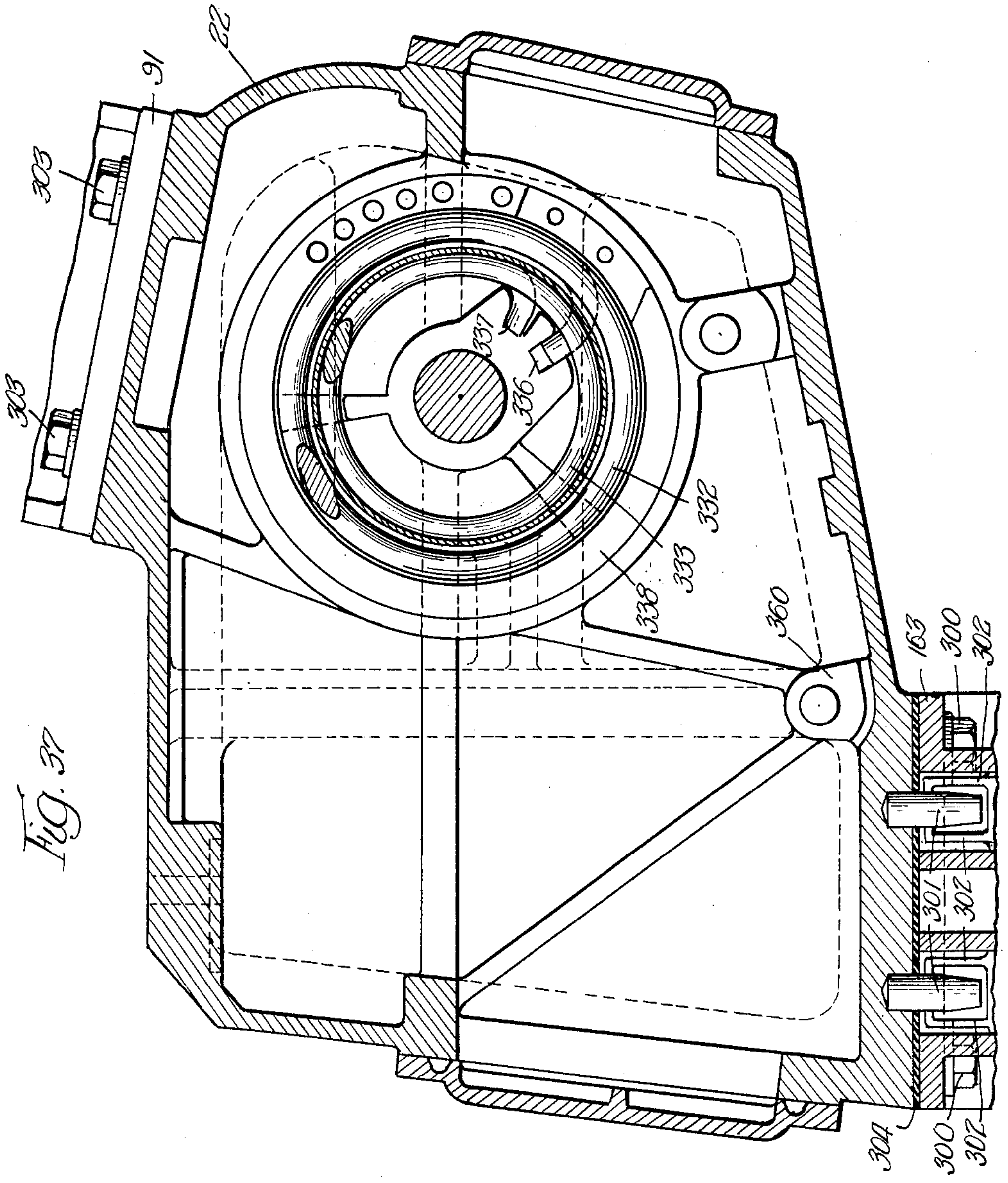
Figures 38, 39, 40, 41, 42, 43:
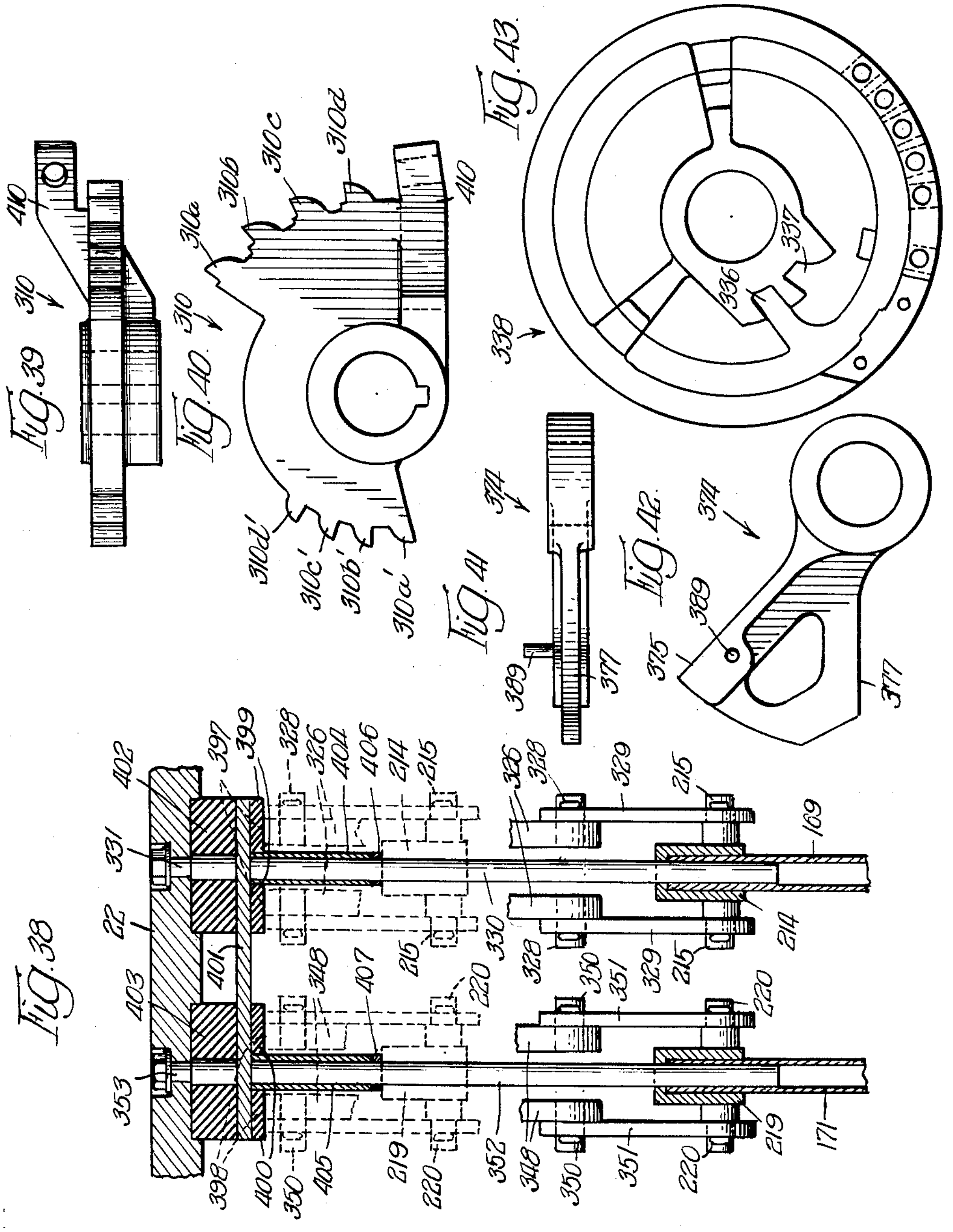
Figure 44:
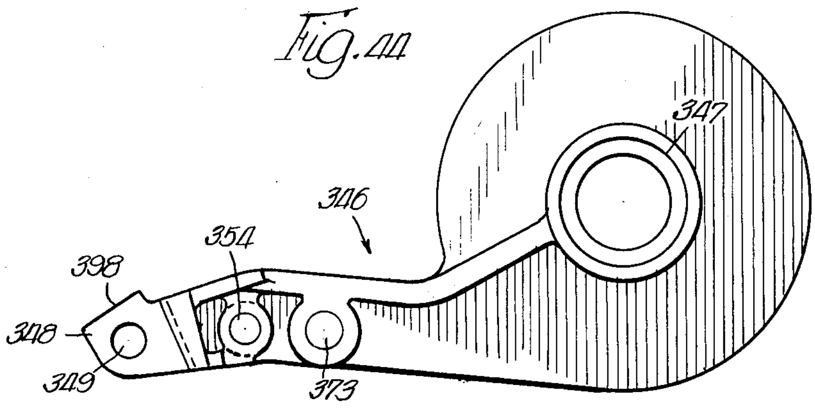
Figure 45:
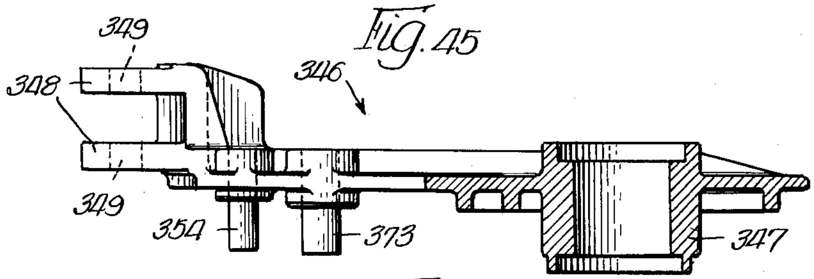
Figure 46:
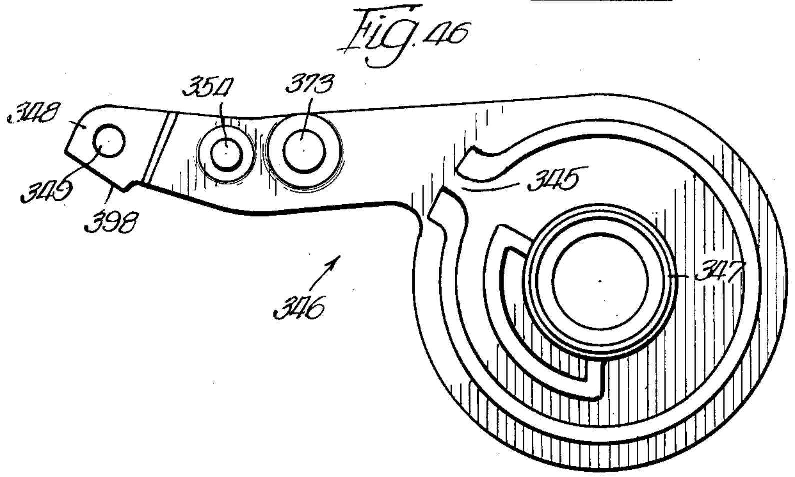
Figure 47:
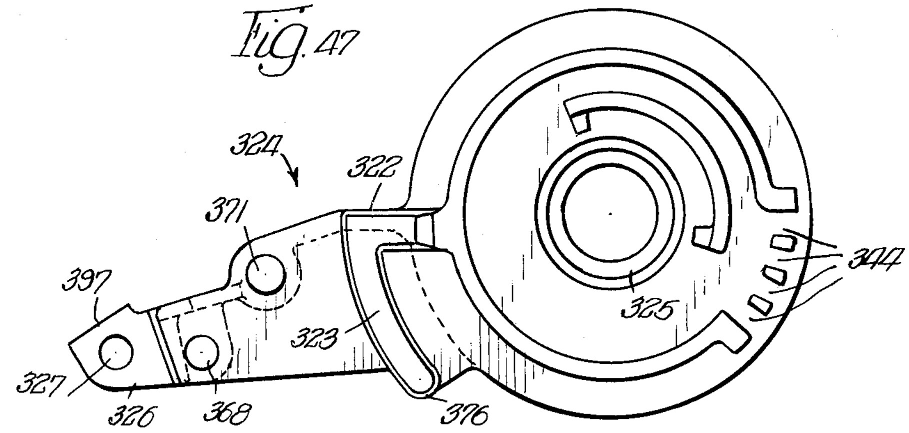
Figures 48, 49:
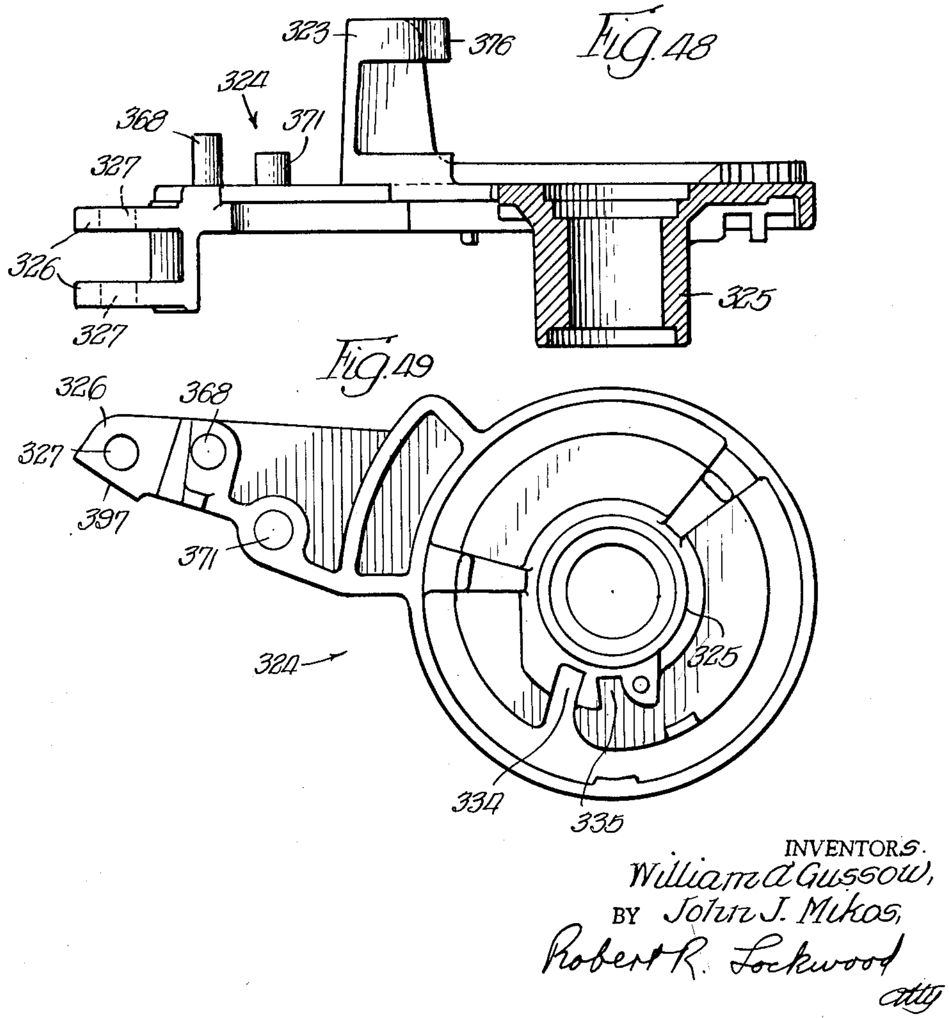

FIGURES 19, 20, 21 and 22 show a vertical sectional view through the load interrupter which is provided with two units, the showing is at an enlarged scale as compared to the showing in FIGURE 18 and certain of the parts are shown for illustrative purposes as being in the plane of the section when, as a matter of fact, they are inclined to this plane as will be apparent from the succeeding sectional views (FIGURE 20 should be placed to the right of FIGURE 19, FIGURE 21 should be placed underneath FIGURE 19 and FIGURE 22 should be placed underneath FIGURE 20);

FIGURE 23 is a vertical sectional view taken generally along the line 23—23 of FIGURES 20 and 22;

FIGURES 24, 25 and 26 are vertical sectional views taken generally along the lines 24—24, 25—25 and 26—26 of FIGURE 19 (sheet 11);

FIGURE 24 is also a vertical sectional view taken generally along the line 24—24 of FIGURE 20 (sheet 12);

FIGURES 27, 28, 29 and 30 are vertical sectional views taken generally along the lines 27—27, 28—28, 29—29 and 30—30, respectively, of FIGURE 20 (sheet 12);

FIGURES 31, 32 and 33 are vertical sectional views taken generally along the lines 31—31, 32—32 and 33—33, respectively, of FIGURE 22 (sheet 14);

FIGURE 34 is a top plan view of the operating mechanism, the cover for its housing having been removed, and the parts being shown in the position corresponding to the closed position of the switch blade with the contacts of the load interrupter in closed position and the operating spring mechanism cocked;

FIGURE 35 is a vertical sectional view taken generally along the line 35—35 of FIGURE 34;

FIGURE 36 (sheet 10) is a partial vertical sectional view taken generally along the line 36—36 of FIGURE 34;

FIGURE 37 is a horizontal sectional view taken generally along the line 37—37 of FIGURE 35 and shows the lower portion of the mechanism housing, the operating spring base and the operating spring mechanism which includes inner and outer springs;

FIGURE 38 is a vertical sectional view taken generally along the line 38—38 of FIGURE 34 (sheet 18) and showing by full lines the positions of the cross heads when the main and auxiliary contacts of the load interrupter are closed and by broken lines the positions of the cross heads when these contacts are in the open position;

FIGURE 39 is a view, in side elevation, of the mechanism cam which rotates conjointly with the intermediate insulator;

FIGURE 40 is a top plan view of the mechanism cam shown in FIGURE 39;

FIGURE 41 is a view, in side elevation, of the pry out cam;

FIGURE 42 is a top plan view of the pry out cam shown in FIGURE 41;

FIGURE 43 is a top plan view of the operating spring base which is located at the bottom of the mechanism housing and to which the ends of the inner and outer springs, which make up the operating spring mechanism, are secured and by means of which the tension therein can be adjusted;

FIGURE 44 is a top plan view of the auxiliary operating arm which is connected to the movable auxiliary contacts of the load interrupter and is arranged to be moved at a relatively high speed;

FIGURE 45 is a view, partly in side elevation and partly in section, of the auxiliary operating arm shown in FIGURE 44;

FIGURE 46 is a bottom plan view of the auxiliary operating arm shown in FIGURES 44 and 45;

FIGURE 47 is a top plan view of the main operating arm which is connected to the movable main contacts of the load interrupter and is arranged to be operated first for separating the main movable contacts from the stationary main contacts during a cycle of circuit interrupter operations;

FIGURE 48 is a view, partly in side elevation and partly in section, of the main operating arm shown in FIGURE 47; and FIGURE 49 is a bottom plan view of the main operating arm shown in FIGURES 47 and 48.

Figures 1, 2:
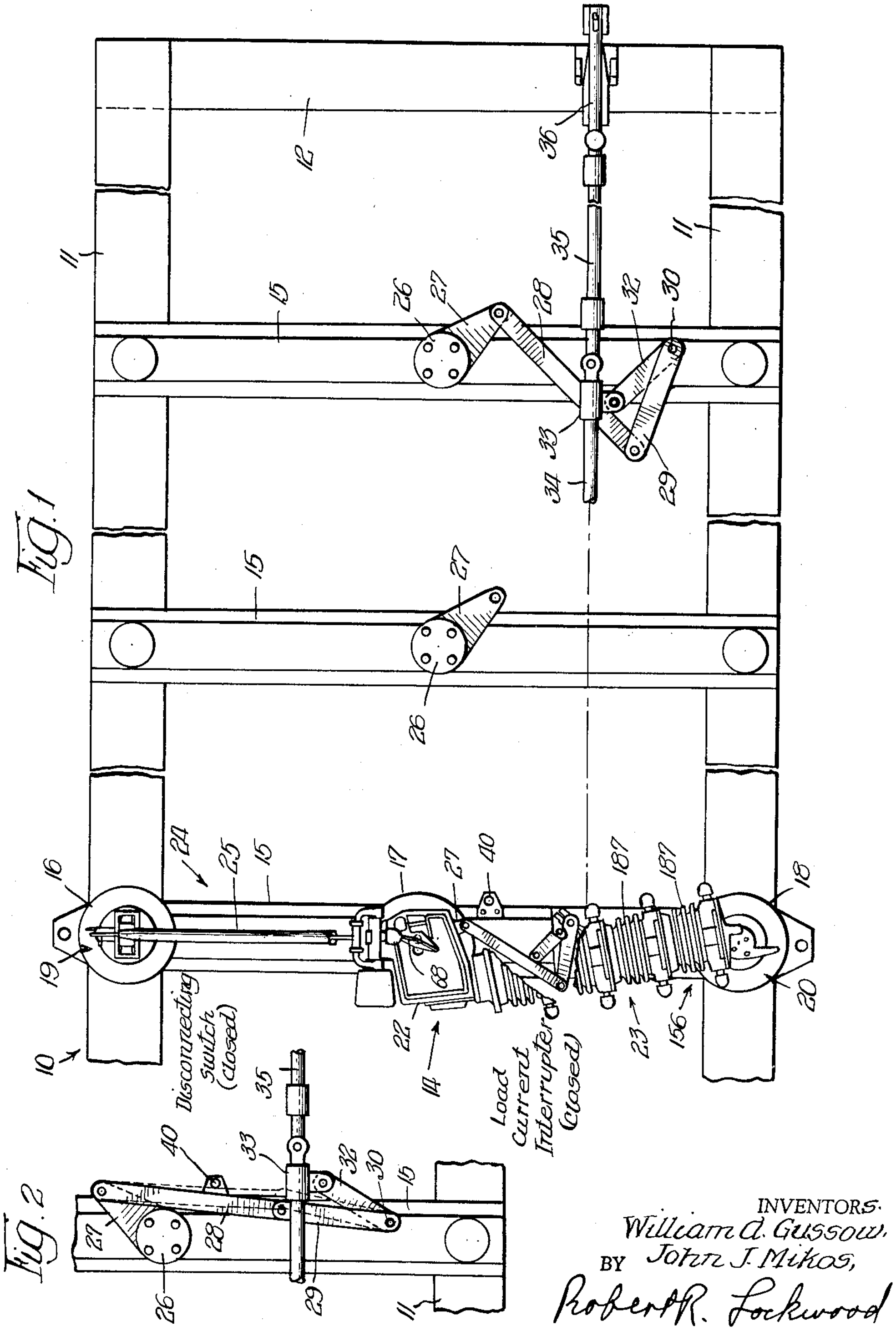
FIGURE 2 is a top plan view of the operating linkage that is associated with each of the poles, the linkage being shown in the position corresponding to the open position of the disconnecting switch blade.
Figures 3, 8:
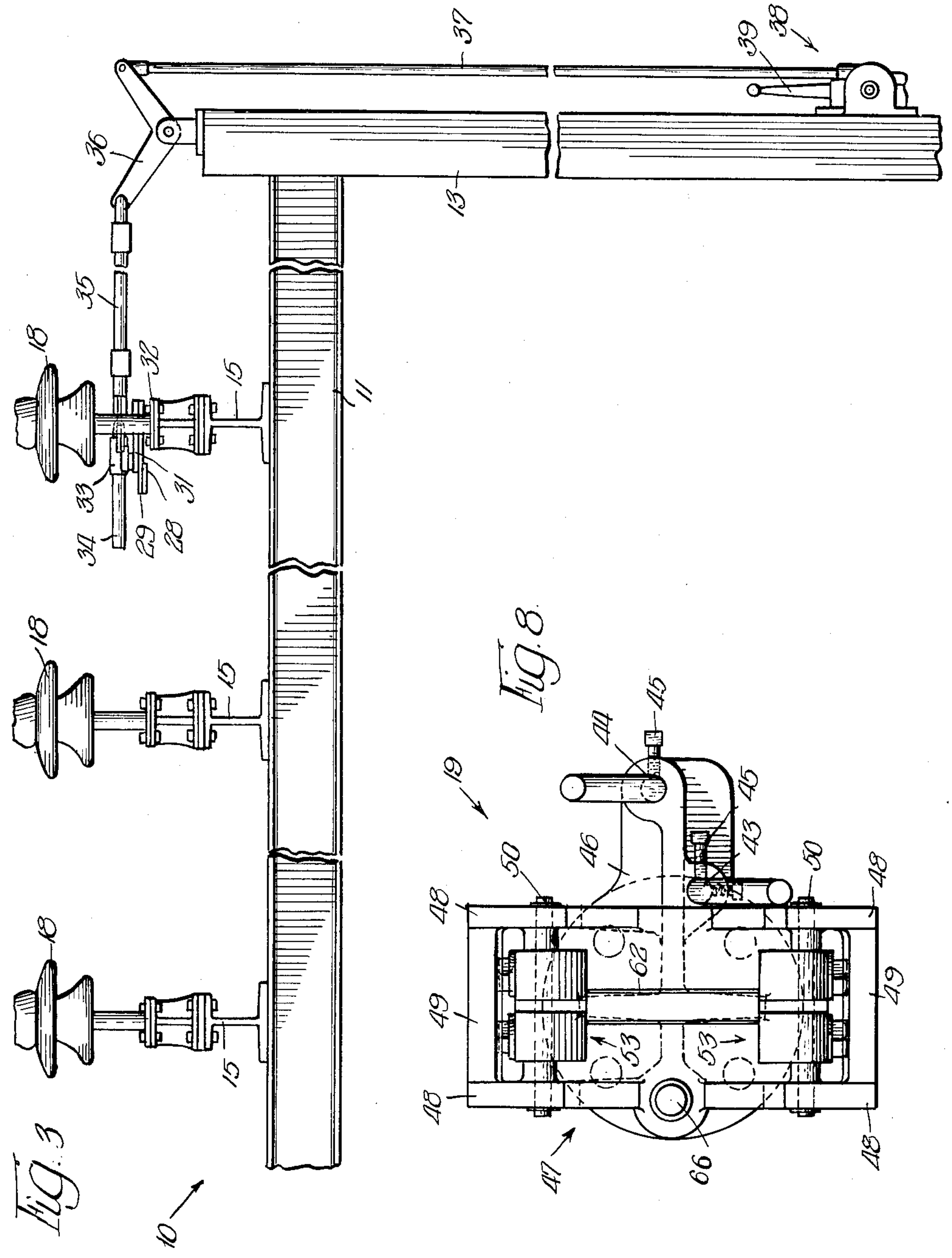
FIGURE 3 is a view, in side elevation, of the structure shown in FIGURE 1, only portions of the nearest insulators being shown.
FIGURE 8 (sheet 2) is a top plan view of the line contact as shown in FIGURES 6 and 7.
Figures 4, 5:
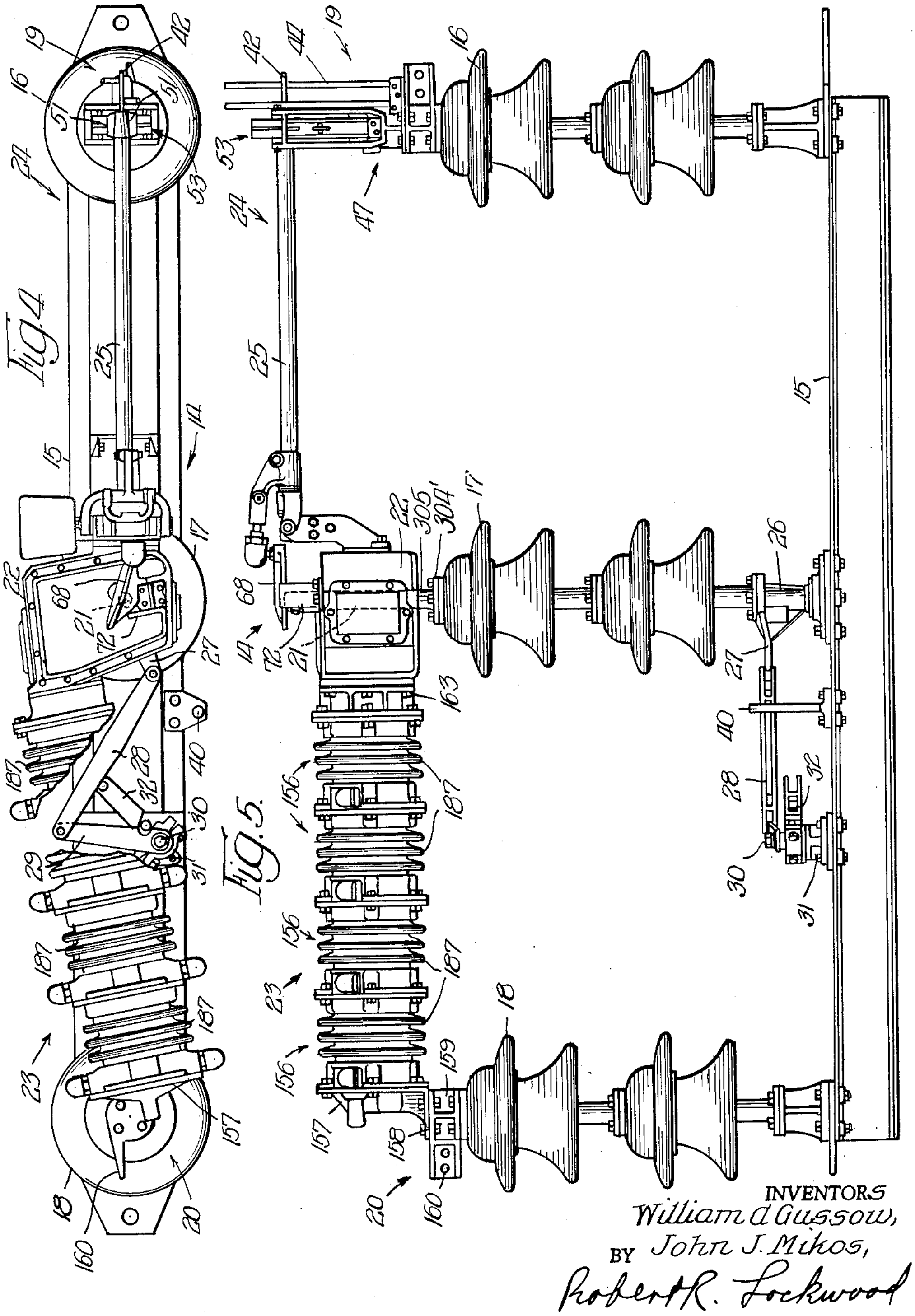
FIGURE 4 is a top plan view of the switch means in FIGURE 2, the illustration being at a larger scale.
FIGURE 5 is a view, in side elevation, of the switch means shown in FIGURE 4.

Reference will be had first to FIGURES 1–5 of the drawings. The reference character 10 designates, generally, a switch support structure which may include longitudinal members 11, cross members 12 (only one being shown), and vertical members 13 all of which constitute a suitable support for gang operated switch means such as the switch means, shown generally at 14, in which the present invention is embodied. It will be understood that the present invention is employed in conjunction with a high voltage three phase alternating current power distribution system. For illustrative purposes it is pointed out that the system may be operated at a voltage of 69 kv. However, other voltages can be used with appropriate changes in design as will be understood readily. In FIGURES 1, 4 and 5 the switch means 14 comprises one of the poles of the three pole switch and provision is made, as will appear hereinafter, for simultaneously operating each switch means 14 in order to interrupt each phase of the circuit simultaneously while load current flows therein. Since the switch means 14 for each phase is the same, only one is illustrated and described in detail herein.

Each switch means 14 includes a base 15 which is supported at its ends on the longitudinal members 11. The spacing between the bases 15 depends upon the voltage of the system. First, second and third insulators 16, 17 and 18 are mounted on the base 15 for each switch means 14. The first and third insulators 16 and 18 are stationary while the intermediate second insulator 17 is rotatably mounted. A line contact member, shown generally at 19, is stationarily mounted on the first insulator 16. A line terminal, shown generally at 20, is stationarily mounted on the third insulator 18. It will be understood that the line conductors are connected to the line contact member 19 and to the line terminal 20.

Rotatable with the second insulator 17 is a shaft 21 which projects upwardly through a metallic housing 22 that is held stationary with respect to the second insulator 17 and constitutes a terminal intermediate the line contact member 19 and the line terminal 20. One end of a load current interrupter, shown generally at 23, is secured to one side of the housing 22 while its other end is secured to the line terminal 20. In series with the load current interrupter 23 is a disconnecting switch that is shown generally at 24. It includes a switch blade 25 which is rotatably mounted on the housing 22 and also is mounted, as will be described hereinafter, to rotate about its longitudinal axis for high pressure contact engagement with the line contact member 19 which forms the stationary part of the disconnecting switch 24.

The switch means 14 is shown in the closed position in FIGURES 1, 4 and 5 of the drawings. In this position the load current interrupter 23 is closed and the disconnecting switch 24 is closed. In accordance with this invention provision is made for opening the circuit first by means of the load current interrupter 23. This is effected during the initial portion of the rotation of the second insulator 17 from a position corresponding to the switch closed position to its position which corresponds to the switch open position. When starting to open the switch means 14, rotation of the second insulator 17 through a small arc effects rotation of the switch blade 25 about its longitudinal axis but, before it separates from the line contact member 19, the circuit has been interrupted and current ceases to flow as the result of operation of the load current interrupter 23. On continued rotation of the second insulator 17, the switch blade 25 is swung to the open position which is slightly more than 90° away from the horizontal position shown in the drawings. During the movement of the switch blade 25 to the open position, which is essentially a vertical upright position, the spring which is released on initial movement of the second insulator 17 for operating the load current interrupter 23 is recocked and the contacts of the load current interrupter 23 are reclosed. When the second insulator 17 is rotated in the opposite direction, the only function performed thereby is the swinging of the switch blade 25 from the vertical position to the horizontal switch closed position terminating in a rotation of the switch blade 25 about its longitudinal axis to move it into high pressure contact engagement with the line contact member 19. The circuit is completed between the switch blade 25 and the line contact member 19 since the load current interrupter 23 is closed.

Once the operator has begun the sequence for opening the contacts of the load current interrupter 23 and swinging of the switch blade 25 to the open position, provision is made, as described hereinafter, for preventing a reverse movement of the second insulator 17 until the switch blade 25 has been swung to the full open position accompanied by the reclosure of the contacts in the load current interrupter 23 and recocking of its operating spring.

On operation toward reclosure of the circuit, should the operator decide to reopen the switch blade 25 of each switch means 14 after he has moved it into close proximity with the line contact member 19, he can do so. However, the operating mechanism is so arranged that the switch blade 25, under these circumstances, must be returned to the full open position and at the same time the contacts of the load current interrupter 23 are opened and subsequently closed and the operating spring mechanism therefor recocked during the final portion of the movement of the switch blade 25 to the open circuit position.

The contacts of the load interrupter 23 are reclosed only after adequate disconnect distance has been established between the line contact member 19 and the switch blade 25 and after the switch blade is open to prevent the flow of leakage current across the gaps of the interrupter units due to normal frequency voltage or to the surge voltages that may be present where the line contact member 19 is connected to an energized line. Since the contacts of the load interrupter 23 are closed when the switch blade 25 is swung to closed position, the switch blade 25 closes against a fault if such should exist. This prevents damage to the load interrupter 23 by large fault making currents which can be carried but not interrupted by it.

Should the operator swing the switch blade 25 into close proximity with line contact member 19 and then decide not to complete the closure of the switch because of encounter with ice or other mechanical obstruction or for other reasons, on reversal of movement of the switch blade 25, the load interrupter 23 is opened. This prevents the formation of a large unconfined arc. When an arc is drawn under these circumstances, the current flow therethrough is interrupted by the load interrupter 23 before a large arc can form and get out of control. As will presently appear, a number of tripping points are provided which permit reversal of closing movement of the switch blade 25. This gives the operator considerable latitude in operation and permits him to decide when the switch blade 25 is close enough to cause an arc to strike to the line contact member 19, or to permit interruption should the switch blade 25 be touching arcing tips (to be described), or to permit interruption because the switch blade 25 is not fully seated as may be the case where ice is involved. Also the operator can proceed from a fully closed switch position.

In FIGURE 1 it will be noted that a rotatable fitting 26 is provided on which each insulator 17 is carried and by means of which it is rotated to effect the sequence of operations just outlined. Extending from each rotatable fitting 26 is an arm 27 to the outer end of which one end of a link 28 is pivotally connected. The other end of the link 28 is pivotally connected to a link 29 which is secured to a shaft 30 that is journaled in a bearing 31 which is mounted on the respective base 15. Also fastened to the shaft 30 is an arm 32 which is pivoted to a fitting 33 that is fast on an interphase rod 34 common to the three switch means 14. The arm 32 is clamped to the shaft 30 and thereby it can be adjusted readily in relation to the link 29 to accommodate variation in the spacing between the switch means 14 and other dimensions and clearances of the entire assembly to the end that the positioning of the interphase rod 34 is not critical. The lengths of the links 28 and 29 and of the arm 32 are such and they are so related that the effort of the operator in opening the several switch means 14 is expended at maximum mechanical advantage during the cycle of operation when the load is the greatest.

Any suitable means can be employed for moving the interphase rod 34 from one position to the other in order to rotate the second insulators 17 between the closed and open positions of the respective switch means 14. The operating means provided for moving the interphase rods 34 should be such as to require that a complete cycle of operation be effected after a switch opening operation has been initiated. In accordance with this invention the interphase rod 34 is operated through the agency of a rod 35 which is pivotally connected to one arm of a bell crank 36 while the other end, as shown in FIGURE 3 of the drawings, is connected by a vertical rod 37 to an operator, shown generally at 38, of the ratchet type which includes an operating handle member 39 for manual operation by a lineman.

When the switch blade 25 has been operated to the full open position the links 28 and 29 are moved past the center position shown by full lines in FIGURE 2 to their over center position, shown by broken lines, where further movement is prevented by a toggle stop 40 carried by the respective base 15. This toggle arrangement provides sufficient leeway to accommodate maladjustment of the various components and insures that each load interrupter 23 fully latches without requiring critical adjustment of the operating linkages.

Figures 6, 7:
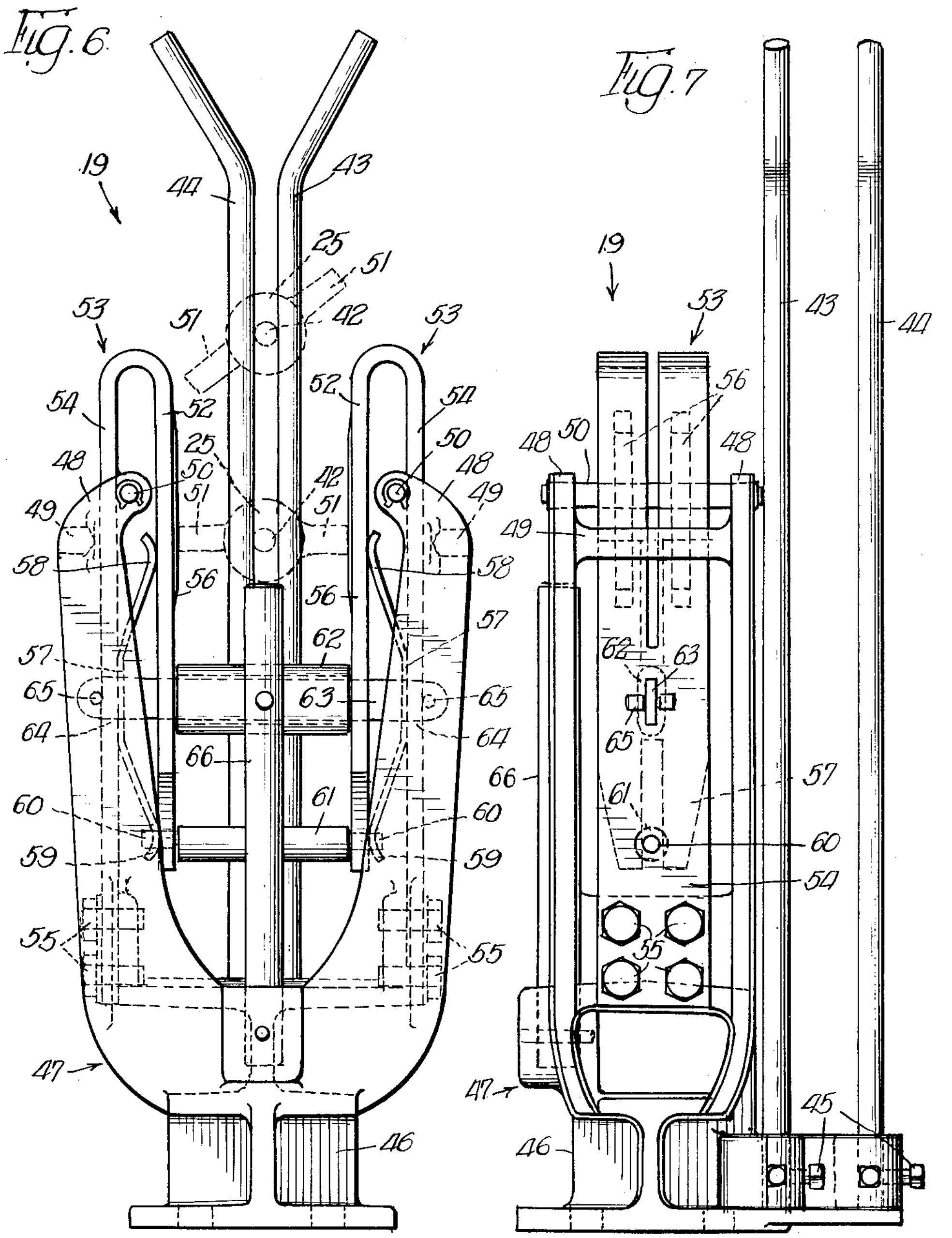
FIGURE 6 is an elevational view of a line contact which is stationarily mounted on one of the insulators and is arranged to be engaged and disengaged by the switch blade.
FIGURE 7 is a view, in side elevation, of the line contact shown in FIGURE 6.

FIGURES 6, 7 and 8 of the drawings show the details of construction of the line contact member 19. It will be recalled that the switch blade 25, in the switch closed position, makes contact with the line contact member 19. The switch blade 25 is provided at its outer end with an arcing tip 42 which is arranged to provide the initial and final contact engagement between the switch blade 25 and the line contact member 19. The arcing tip 42 constitutes an endwise extension of the switch blade 25 and can be readily removed and replaced should it become eroded due to arcing. It is arranged to engage and disengage flexible arcing horns 43 and 44 having circular cross sections which are secured in staggered relation by set screws 45 to a base portion 46 of a contact housing member which is shown, generally, at 47. It will be noted that the arcing horns 43 and 44 are spaced apart along the arcing tip 42 a distance several times the transverse dimension or diameter of the arcing horns 43 and 44. The housing member 47 is arranged to be mounted on the first insulator 16 as is shown more clearly in FIGURE 5 of the drawings. The reasons for positioning the arcing horns 43 in staggered relation are to facilitate the breaking of ice should they become so encased under certain adverse weather conditions and to insure that contact is always maintained on one side or the other of the arcing tip 42 despite strong lateral vibrations of the arcing horns 43 and 44 and the switch blade 25 incident to fast operation. Since the arcing horns 43 are likely to require replacing, they are detachably mounted, as indicated, on the base portion 46 by the set screws 45.

The contact housing member 47 is formed preferably of good conducting material, such as cast brass, and it includes upwardly extending spaced arms 48 which are interconnected by integrally formed transversely extending webs 49. In addition the upper ends of the arms 48 are interconnected by transversely extending pins 50.

It is desirable that the switch blade 25 have high pressure contact engagement with the line contact member 19. The reason for this is to improve the current carrying capacity and reduce heating. For this purpose the switch blade 25 at its swinging end is provided with laterally extending ears 51 that are arranged to be rotated on rotation of the switch blade 25 about its longitudinal axis into and out of high pressure contact engagement with downturned bifurcated inner branches 52 of inverted generally U-shaped contact members 53 that are formed preferably of copper and have substantial inherent resiliency. The downturned outer branches 54 of the contact members 53 overlie intermediate portions of the contact housing member 47 and are secured thereto in good conducting relation therewith by bolts 55. Silver alloy inlays 56 can be provided along the contact engaging surfaces of the inner branches 52 to improve the contact conditions with the outer edges of the ears 51 which likewise can be provided with silver alloy inlays.

In order to augment the inherent resiliency of the contact members 53 and to urge the inner branches 52 thereof into high pressure contact engagement with the ears 51, leaf springs 57 are employed and are positioned between the branches of the contact members 53 as shown more clearly ni FIGURE 6. The upper ends 58 of the leaf springs 57 engage the inner branches 52 substantially opposite the ears 51 of the switch blade 25 when it is located in the fully closed position. The lower ends 59 of the leaf springs 57 bear against the lower ends of the inner branches 52 while the intermediate portions of the leaf springs 57 bear against the inner surfaces of the downturned outer branches 54.

The lowermost ends of the inner branches 52 of the contact members 53 are arranged to receive ends 60 of a spacer pin 61 the intermediate portion of which is enlarged, as shown in FIGURE 6, to limit the movement of the lowermost portions of the inner branches 52 toward each other under the biasing action of the leaf springs 57. The ends 60 of the spacer pin 61 extend through suitable openings in the lower ends of the leaf springs 57 and thereby hold them in position.

With a view to spacing the inner branches 52 of the contact members 53 apart for the purpose of providing a prestressed spring construction, there is provided a spacer sleeve 62 therebetween. It will be understood that the sleeve 62 limits the movement of the inner branches 52 toward each other under the influence of the leaf springs 57 in the absence of the lateral ears 51 of the switch blade 25. It is only necessary to move the inner branches 52 slightly outwardly on engagement therewith by the ears 51 in order to develop the full biasing action of the leaf springs 57 and the inherent resiliency of the contact members 53.

The spacer sleeve 62 is supported and the biasing action applied to the inner branches 52 of the contact members 53 is equalized by an equalizer bar 63 which extends through the sleeve 62, between the bifurcated inner branches 52 of the contact members 53 and through openings 64 in the downturned outer branches 54. Transverse pins 65 extend through the ends of the equalizer bar 63 and bear against the outer sides of the downturned outer branches 54. This construction accommodates some misalignment between the switch blade 25 and the line contact members 19 and provides for equalizing the contact pressure that is applied to the lateral ears 51. During heavy current flow, such as under short circuit conditions, the contact pressure between the ears 51 on the switch blade 25 and the inner branches 52 increases greatly because of the forces developed as a result of the U-shape of the contact members 53. Under these conditions the inner branches 52 tend to move away from the outer branches 54 which are mechanically interconnected by the equalizer bar 63. Ultimately the outer branches 54 engage the transverse webs 49 resulting in maximum pressure being exerted by the inner branches 52 against the ears 51. The force exerted against the ears 51 is not changed by distortion of the inner branches 52.

Any suitable means can be employed for effecting the twisting of the switch blade 25 about its longitudinal axis to relieve the high pressure contact engagement with the line contact member 19 and subsequent swinging of the switch blade 25 to the vertical open position by rotation of the shaft 21 together with the rotation of the second insulator 17. For example, the operating mechanism disclosed in Gussow application Serial No. 417,655, filed May 22, 1954, now Patent No. 2,818,474, issued December 31, 1957, can be employed.

Referring to FIGURES 6, 7 and 8, it will be observed that an upwardly extending stop pin 66, carried by the base portion 46 of the line contact member 19, limits the final closing movement of the switch blade 25 when engagement therebetween takes place as indicated by the broken line showing of the switch blade in FIGURE 6.

Figure 9:
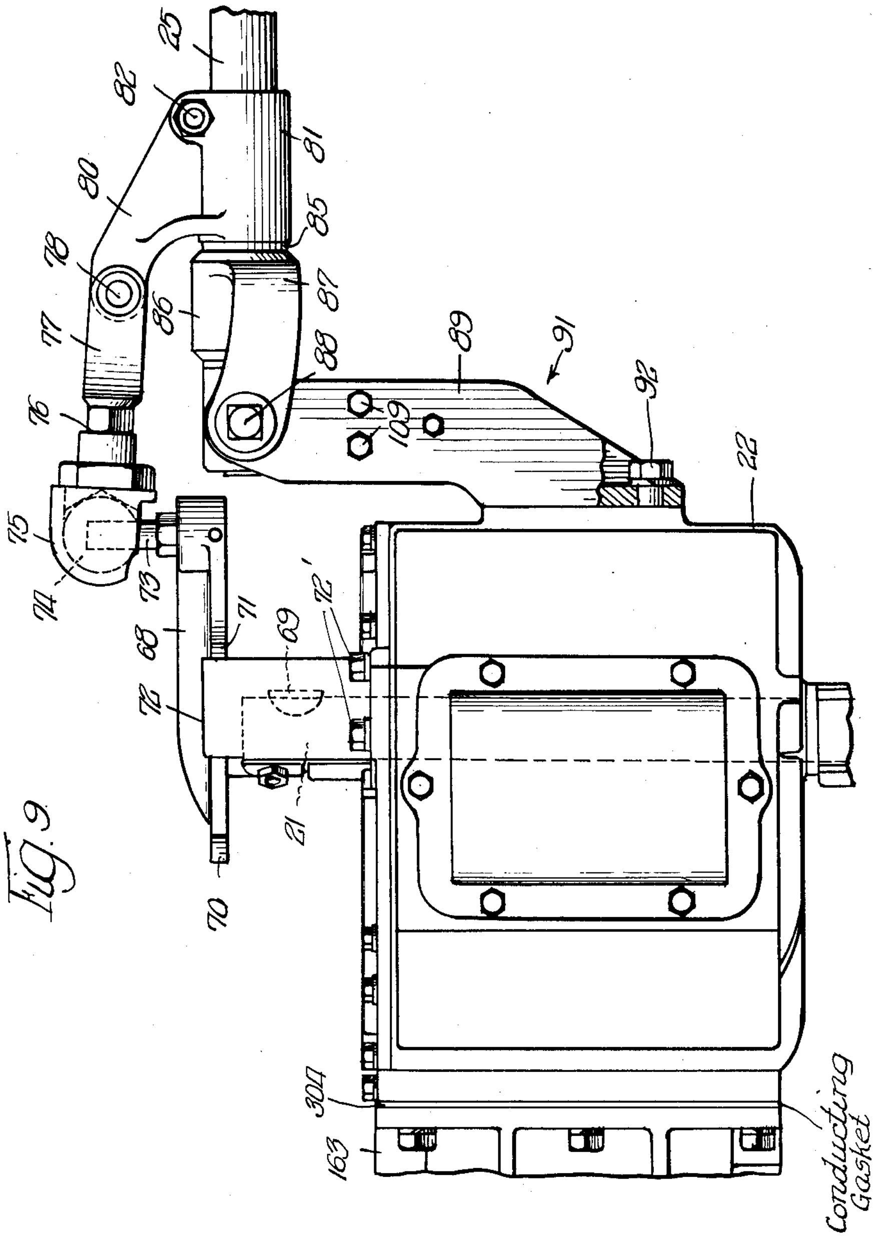
FIGURE 9 is a view, in side elevation and at an enlarged scale, of the hinge end of the switch blade, showing a portion of the switch contact mounted thereon and the mechanism housing.
Figure 10:
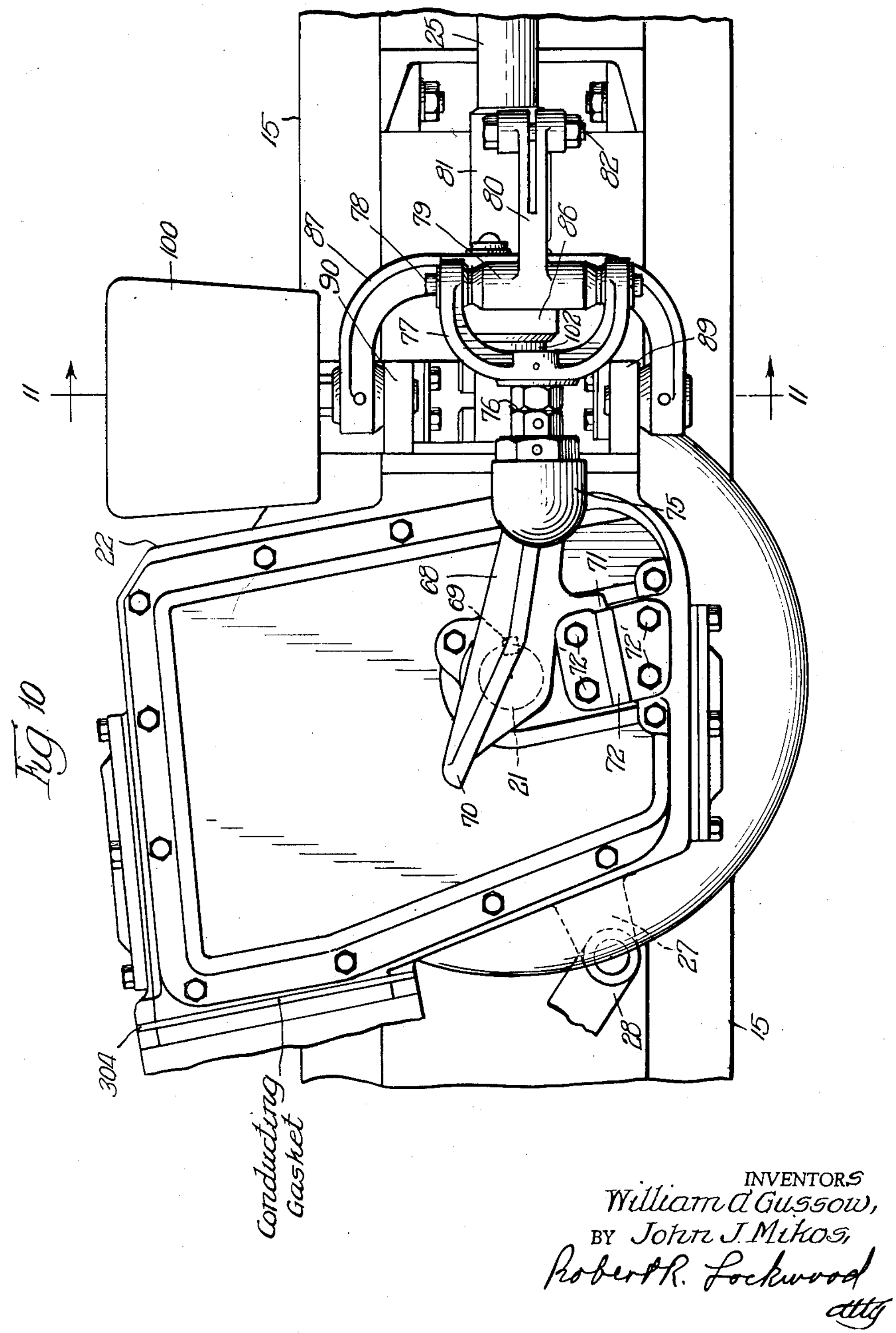
FIGURE 10 is a top plan view of the construction shown in FIGURE 9.
Figures 11, 14:
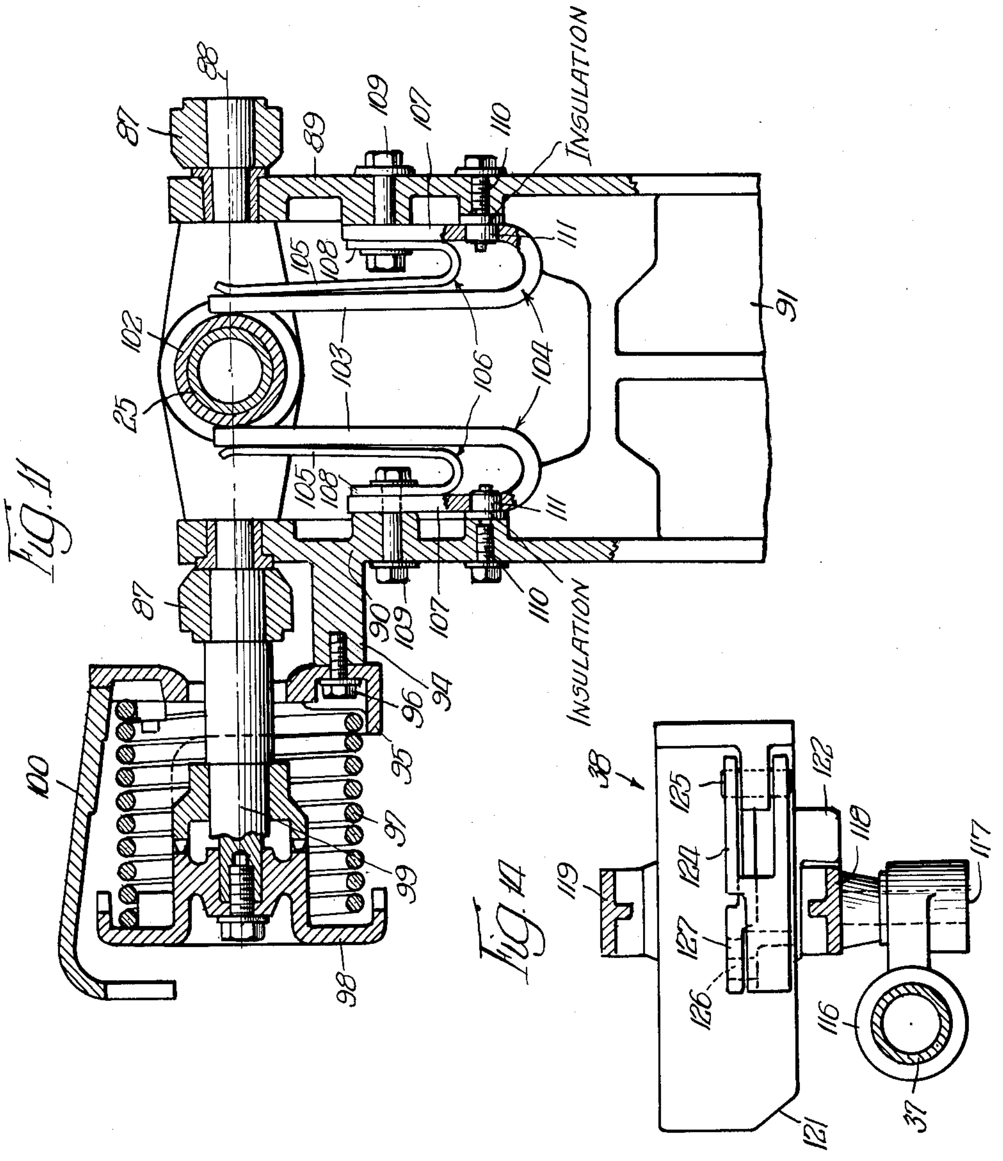
FIGURE 11 is a vertical sectional view taken generally along the line 11—11 of FIGURE 10.
FIGURE 14 (sheet 7) is a horizontal sectional view taken generally along the line 14—14 of FIGURE 13.

In FIGURES 9, 10 and 11 of hte drawings a suitable mechanism for interconnecting the shaft 21 and switch blade 25 is illustrated. It includes a switch crank 68 that is non-rotatably secured to the shaft 21 by a key 69. The rotation of the shaft 21 is limited to about 100° by stop shoulders 70 and 71. In the closed position of the switch blade 25, as shown in FIGURE 10, the stop shoulder 71 is in engagement with one side of a stop 72 that is secured in position on the mechanism housing 22 by bolts 72'. In the open position of the switch blade 25, the stop shoulder 70 engages the opposite side of the stop 72. In this manner the rotation of the shaft 21 is limited through the cooperation of the stop shoulders 70 and 71 with the stop 72 and the arrangement is such that the switch blade 25 is rotated about its longitudinal axis and swung to the open position while the switch crank 68 is moving from the position shown in FIGURE 10 of the drawings to a position in which the stop shoulder 70 engages the stop 72. During this movement of the shaft 21, the mechanism within the mechanism housing 22 functions, as will be described in detail hereinafter, first to effect the interruption of the circuit by operation of the load current interrupter 23 before the switch blade 25 disengages the line contact member 19 and then, during the latter part of the movement of the shaft 21, the contacts of the load current interrupter 23 are reclosed and its operating spring mechanism is recocked. By the time that the stop shoulder 70 engages the stop 72 and further movement is prevented, the switch blade 25 has been swung slightly past the vertical upright position, the contacts of the load current interrupter 23 have been reclosed and its spring has been recocked. During the reverse movement of the switch crank 68, the only operation effected is the swinging of the switch blade 25 from the vertical upright position to the switch closed position where the circuit is completed between the arcing tip 42 and the arcing horns 43 and 44, followed by engagement of the lateral ears 51 of the switch blade 25 with the inner branches 52 of the contact members 53.

The rotary movement of the switch crank 68 is transmitted to the switch blade 25 through a pin 73 which stands upwardly from the switch crank 68 and carries at its upper end a ball 74 which fits in a socket 75 to which a link 76 is connected that carries at its other end a clevis 77. The arms of the clevis 77 are pivotally connected by a pin 78 to a head 79 that is formed integrally with an arm 80 which is provided with a clamp portion 81 that surrounds the hinge end of the switch blade 25 and is secured in good contact engagement therewith by a clamp bolt 82.

The rotation of the switch crank 68 through approximately 100° not only effects the turning of the switch blade 25 about its longitudinal axis but also causes it to be swung between the horizontal closed position and the vertical open position. To accommodate this compound movement of the switch blade 25, the clamp portion 81 is provided with a rearwardly extending hub portion 85 that is journaled in a bearing 86 which is located on a blade carrier 87 which is pivoted to swing about a horizontal axis 88 in upstanding arms 89 and 90 of a bracket 91 which is secured to the mechanism housing 22 by bolts 92. It will be understood that the bearing 86 provides for the rotation of the switch blade 25 about its longitudinal axis while the blade carrier 87 reacts to swing the switch blade 25 from the horizontal to the vertical position. This compound movement of the switch blade 25 is effected through the rotation of the switch crank 68 that is connected, as described, through the pin 73 to ball 74 in socket 75 and thereby to the pin 78 which is coupled to the arm 80 that is clamped to the switch blade 25.

It is desirable to reduce the torque necessarily applied to the shaft 21 for swinging the switch blade 25 to the open position since sufficient torque must be applied thereto for reclosing the contacts of the load current interrupter 23 and recocking its spring mechanism. For this purpose counterbalancing means are provided as shown in FIGURE 11. It includes an extension 94 from the upstanding arm 90 which carries a housing 95 that is secured in position by bolts 96. Within the housing 95 is a counter-balancing spring 97 which is secured at one end to a spring fitting 98 that is secured to one end of a shaft 99 which extends from the blade carrier 87 and rotates therewith. The other end of the counterbalancing spring 97 is secured to the housing 95. A cover 100 extends from the housing 95 and overlies the spring 97 to prevent pile up of ice thereon. The position that the cover 100 occupies depends upon whether the switch means 14 is located in the horizontal upright position, as shown in the drawings, or is located vertically. In the latter case, the cover 100 is shifted to be above the spring 97 in the alternate position.

The spring 97 is arranged to be stressed when the switch blade 25 is swung from the vertical open position to the horizontal closed position. Here the movement of the switch blade 25 is assisted by gravity. Since the only function of the shaft 21 in rotating to the closed position is to effect the closure of the switch blade 25, the spring 97 can be stressed effectively and its energy can be discharged during the opening movement of the switch blade 25 to assist in such operation.

It is desirable to provide high pressure contact engagement with an extension of the switch blade 25 at its hinge end. For this purpose a contact section 102, FIGURE 11, is formed integrally with the hub portion 85 and it extends into high pressure contact engagement with the inner arms 103 of U-shaped contact members 104. The inner arms 103 are urged into high pressure contact engagement with opposite sides of the contact section 102 by the inner arms 105 of U-shaped leaf springs 106. It will be observed that the leaf springs 106 are nested in the contact members 104 and that the overlying outer arms 107 and 108 thereof are secured to the upstanding arms 89 and 90 of the bracket 91 by bolts 109. Centering pins 110 are employed to insure proper alignment and spacing of the contact members 104. The pins 110 extend through flanged insulated bushings 111 to prevent contact between the lower portions of the outer arms 107 and the arms 89 and 90 and thereby cause the current to flow to the upper portions of the outer arms 107. The tendency for the arms 103 and 107 to move apart on flow of heavy current or short circuit current is increased and there is greater contact pressure exerted against the opposite sides of the contact section 102.

Since the arms 103 engage the contact section 102 along the axis 88 of rotation of the switch blade 25, there is no likelihood of misalignment therebetween. No disengagement takes place between the arms 103 and the contact section 102, hence the arms 103 always engage with full spring force. The underside of the contact structure between the contact members 104 is open resulting in absence of jamming against ice in compression should the same form.

Figure 12:
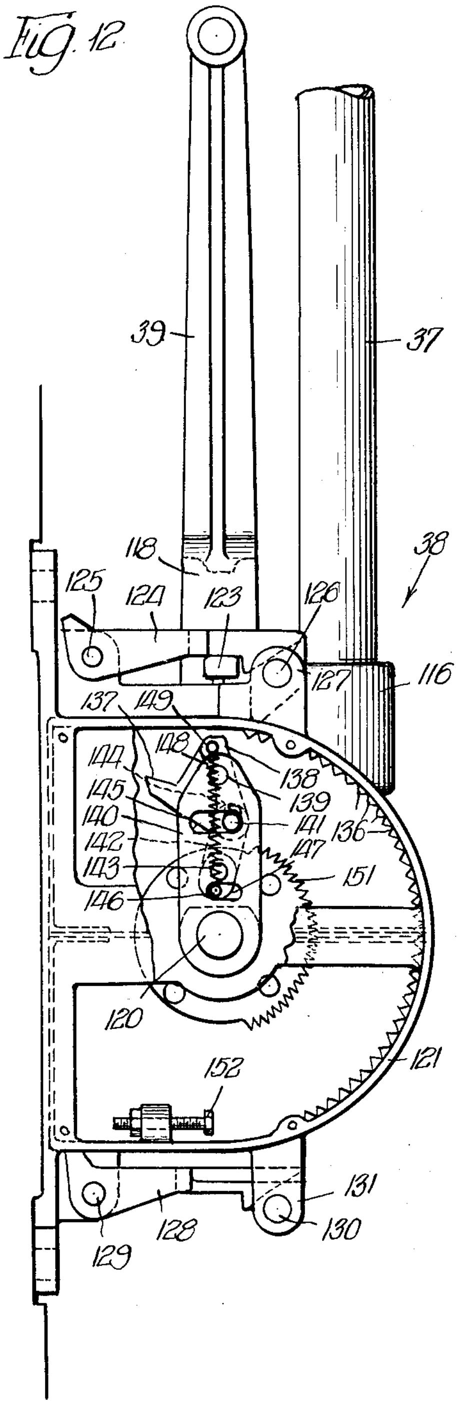
FIGURE 12 is a view, in side elevation, of a ratchet operator for the switch construction shown in FIGURES 1 and 3 of the drawings, the cover having been removed to show the internal details of construction more clearly.
Figure 13:
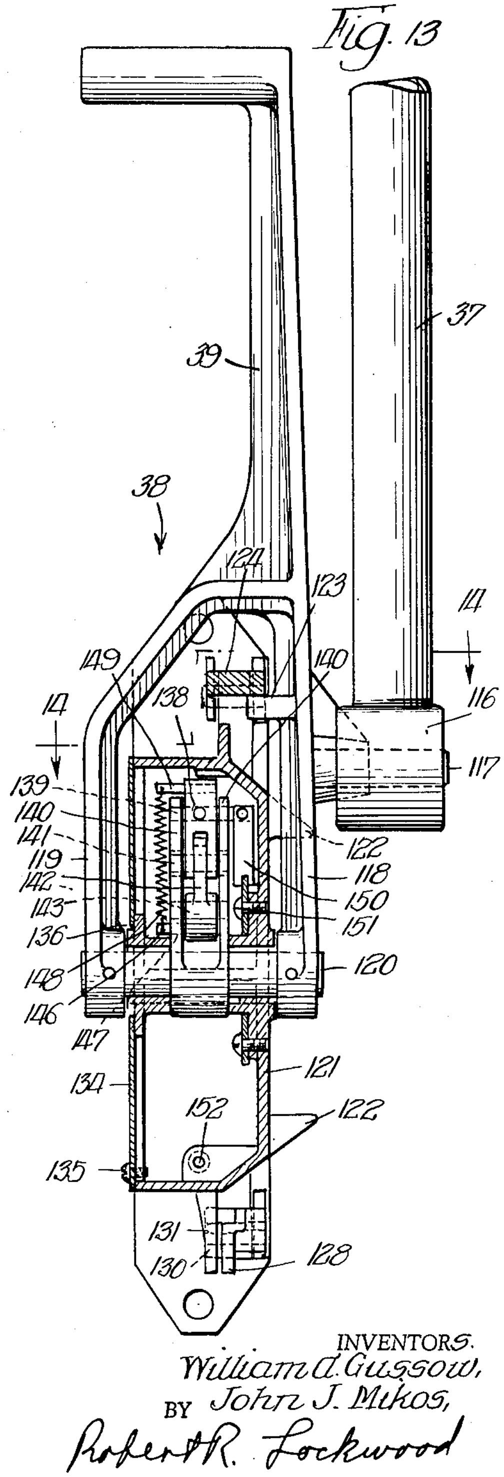
FIGURE 13 is a view, in front elevation, of the operator shown in FIGURE 12, the housing and cover being shown in section.

FIGURES 12, 13 and 14 show the details of construction of the operator 38 which can be employed for controlling the sequential operation of the load current interrupter 23 and disconnecting switch 24. It will be recalled that this sequence of operation for opening the circuit includes the opening of the contacts of the load current interrupter 23 followed by movement of the switch blade 25 out of engagement with the line contact member 19. During the continued movement of the switch blade 25 to the opening position, the contacts of the load current interrupter 23 are reclosed and its spring mechanism is recocked. In order to insure that the contacts of the load current interrupter 23 are reclosed and its spring its recocked, the operator 38 is provided and so constructed as to compel the lineman to complete the opening cycle while preventing reclosure of the disconnecting switch 24 without first reclosing the contacts of the load current interrupter 23 and cocking its operating spring mechanism.

As shown in FIGURES 12, 13 and 14, the vertical rod 37 has a fitting 116 connected thereto at its lower end which is pivoted at 117 to one arm 118 of the handle 39. The handle 39 has another arm 119 and both of the arms 118 and 119 are non-rotatably secured to a shaft 120 which is journaled in a housing 121. The handle 39 is shown in FIGURES 12, 13 and 14 of the drawings in the position corresponding to the closed position of the disconnecting switch 24. It is arranged to be swung downwardly through 180° in order to effect the previously described sequence of circuit opening and reclosure of the contacts of the load current interrupter 23 and recocking of its spring mechanism. On swinging of the handle 39 in a reverse direction from its lowermost position to the position shown in FIGURES 12, 13 and 14, the switch blade 25 is swung to the closed position.

With a view to limiting the swinging movement of the handle 39, stops 122 are provided on the housing 121. They cooperate with the arm 118 for limiting the movement of the handle 39 in either direction.

It is desirable to provide for locking the handle 39 in either of its extreme positions. For this purpose a detent 123 is formed integrally with the arm 118 on its inner side. As shown in FIGURE 12, the detent 123 cooperates with a keeper 124 which is pivoted at 125 on the housing 121 to hold the handle 39 in the upright position. An opening 126 extends through an ear 127, carried by the housing 121, and through the keeper 124 for receiving a hasp of a padlock that can be used to prevent unauthorized operation of the handle 39. A similar construction is provided for holding the handle 39 in the lowermost position. Here a keeper 128, pivoted at 129 on the housing 121, is arranged to engage the detent 123 when the handle 39 is swung to the lowermost position. An opening 130 in an ear 131, carried by the housing 121, registers with an opening in the keeper 128 for receiving the hasp of a padlock.

It will be observed that the housing 121 is generally semi-circular in configuration and that a removable cover 134 is provided which can be held in place by screws 135. Along the inner periphery of the semi-circular portion of the housing 121, as shown in FIGURE 12, there are provided outer ratchet teeth 136 with which a pawl 137, carried by a pawl link 138, is arranged to cooperate to prevent reverse movement of the handle 39 after it has been moved initially to a position where the pawl 137 engages the ratchet teeth 136.

The pawl link 138 forms a part of an overcenter toggle linkage. It is secured to a shaft 139 which is rockably mounted in the outer ends of a pair of arms 140 that are secured to and rotate with the shaft 120. The shaft 139 projects beyond the right hand arm 140, as shown in FIGURE 13, for a purpose that will be apparent presently. At its lower end the pawl link 138 is pivotally connected by a pin 141 to the upper end of a toggle link 142 which is rockably mounted on a pin 143 which extends between the arms 140. The pin 141 extends through an elongated slot 144 in the upper end of the toggle link 142 to permit the overcenter movement of the links 138 and 142. It will be noted that the ends of the pin 141 extend into slots 145 in the arms 140. The ends of the slots 145 determine the extent of swinging movement of the links 138 and 142. Extending from the lower end of the toggle link 142 is a pin 146. It projects through a slot 147 in one of the arms 140 and its outer end is connected by a tension spring 148 to a pin 149 which extends from the upper end of the pawl link 138. The tension spring 148 tends to collapse the toggle joint formed by the links 138 and 142 and to hold them in either overcenter position.

The pawl link 138 is shifted to its alternate position by a click spring 150 which is secured to the projecting end of the shaft 139 as shown in FIGURE 13. The lower end of the click spring 150 rides over inner ratchet teeth 151. After the keeper 124 has been raised and the handle 39 has been swung from the position shown in FIGURE 12 in a clockwise direction through a predetermined extent, for example through 30°, the lower end of the click spring 150 engages the first of the inner ratchet teeth 151 and rocks the pawl link 138 to the alternate position where the pawl 137 engages one of the outer ratchet teeth 136. This range of movement of the handle 39 in either direction permits the operator to rattle the movable exposed parts, such as the rods 34 and 37, operating linkages, etc., to free them of any ice formations that might otherwise interfere with subsequent switch operation. After the handle 39 has been swung through about 30°, it cannot be rotated in a counterclockwise or reverse direction until it has first been swung to the lowermost position. As the handle 39 approaches the lowermost position the pawl link 138 is engaged by an adjustable detent 152 and, during the final movement of the handle 39 in a clockwise direction to its position against the lower stop 122, the adjustable detent 152 is engaged by the pawl link 138 and it is rocked to its alternate position where the pawl 137 no longer is in the path of the outer ratchet teeth 136.

Figures 15, 16, 17:
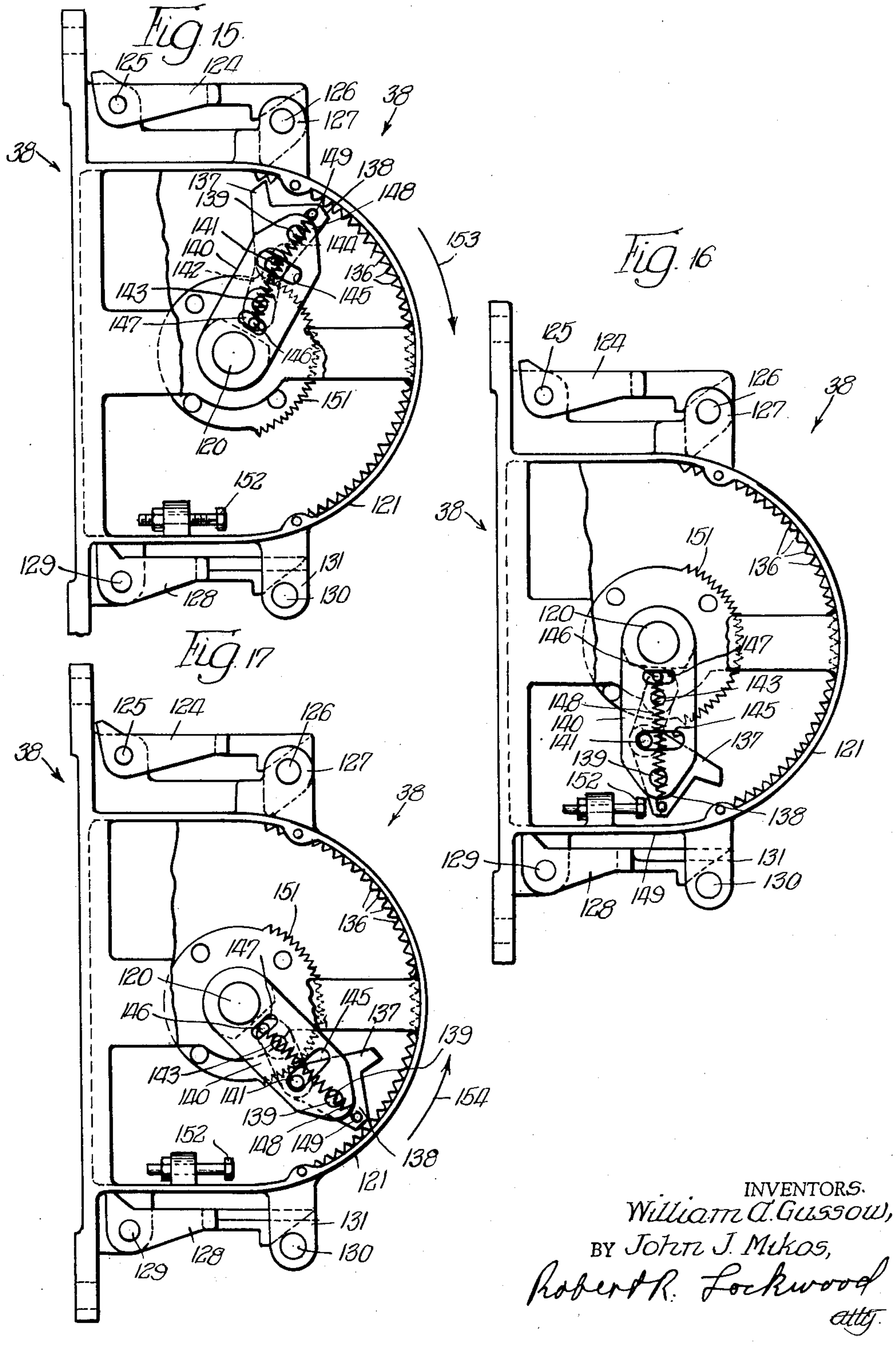
FIGURE 15 is a view, similar to FIGURE 12, showing the ratchet mechanism in operation on movement of the operating handle toward the open position.
FIGURE 16 is a view, similar to FIGURE 15, showing the ratchet mechanism in the position corresponding to the full open position of the switch blade.
FIGURE 17 is a view, similar to FIGURE 16, showing the position of the ratchet mechanism on movement of the operating handle part way from the fully open position toward the fully closed position of the switch blade.

Various typical positions of the operator 38 are shown in FIGURES 15, 16 and 17 of the drawings. For clarity the rod 37, handle 39 and detent 123 are not shown in these figures. FIGURE 15 shows the pawl link 138 in the alternate position with the pawl 137 engaging the first of the outer ratchet teeth 136 as the arms 140 and the handle 39, FIGURE 12, are rotated in a clockwise direction as indicated by the arrow 153. After the pawl link 138 has been swung to the position here shown, the handle 39 cannot be reversed but must be swung to the lowermost position.

FIGURE 16 shows the arms 140 in the lowermost position where the pawl link 138 has been moved to its alternate overcenter position by engagement with the adjustable detent 152.

FIGURE 17 shows how the pawl 137 is held out of engagement with the outer ratchet teeth 136 while the arms 140 and the handle 39 are being swung from their lowermost position in a counterclockwise direction, as indicated by the arrow 154, to the uppermost position. However, while the arms 140 and the handle 39 are being swung upwardly, if the lineman should reverse the handle 39 before reaching its full upper position and move it downwardly again, the click spring 150, since it is in engagement with the inner ratchet teeth 151, would promptly flip the pawl link 138 to the position shown in FIGURE 15. Then it would be necessary for the lineman to return the arms 140 and the handle 39 to the lowermost position before he is permitted to move the handle 39 upwardly to the position corresponding to the closed position of the disconnecting switch 24.

As will appear hereinafter, provision is made for opening the contacts of the load current interrupter 23 prior to the movement of the switch blade 25 to the fully closed position. Such action may be necessary when the line contact member 19 is coated with ice and it is necessary to attempt to reclose the switch blade 25 a number of times. Such reversal in movement of the handle 39 under these conditions ordinarily would take place near the upper end of its closing movement. The requirement that the handle 39 be swung downwardly through the complete stroke on reversal of its upward movement insures that the contacts of the load current interrupter 23 will be reclosed and its spring mechanism recocked before another attempt is made to move the switch blade 25 into contact with the line contact member 19.

FIGURES 18–33 show in more detail the construction of the load current interrupter 23. In general this interrupter comprises series connected main and auxiliary contact members which are connected in parallel circuit relation. The main contact members are arranged to carry the load current and to withstand the flow of short circuit current. Provision is made for opening the main contacts first, followed by opening of the auxiliary contacts where arcs are drawn in series and extinguished. The movable contacts of the main contact assembly necessarily are substantially heavier than the movable contacts of the auxiliary contact assembly. Provision is made for separating the series connected main contacts and transferring the current flow to the series connected auxiliary contacts which subsequently are opened as a result of applying thereto not only the biasing action of the operating spring mechanism but also a portion of the kinetic energy imparted to the movable main contacts while they are moving from the closed to the open position.

As illustrated in FIGURE 18 the load current interrupter 23 is made up of a plurality of interrupter units 156. The number of interrupter units 156 used depends upon the voltage of the circuit in which the switch means 14 is connected. For example, if the circuit voltage is 34.5 kv., two interrupter units 156, constructed as herein described, can be used. For a circuit operating at a voltage of 69 kv., four of the interrupter units 156 can be used. For higher voltages additional interrupter units 156 can be employed or the interrupting ability of the interrupter units 156 can be increased by hermetically sealing them and filling them with a suitable arc extinguishing gas. The interrupter units 156 are of identical construction except for the unit adjacent the mechanism housing 22. This unit is slightly different in certain respects as will presently appear. By employing this unit construction manufacuring costs are reduced and repair and replacement of parts are facilitated.

At the left hand end of the load current interrupter 23 there is provided a terminal plate 157, FIGURES 5 and 18, which has a flange 158 integrally formed therewith for mounting on an adapter 159 carried by the insulator 18 from which a terminal lug 160 extends to which a line conductor is connected. This construction facilitates removal of the load current interrupter without disturbing the connection of the line conductor to the terminal lug 160. At the other end of the load current interrupter 23 there is provided an adapter or end terminal member 163 which is arranged to mount the other end of the interrupter on the mechanism housing 22.

As shown in FIGURE 22 an end stationary main contact 164 is provided within the adapter 163. The main contact 164 includes integral contact fingers 165 which are biased inwardly by the fingers of a surrounding contact spring 166. A ring 165' limits the inward movement of the contact fingers 165 when they are not engaged by a movable main contact to be described. The main contact 164 is telescoped within a sleeve portion 167 that is cast integrally with the adapter 163 and it is held in place therein by set screws 168. Extending through the adapter 163 is a main contact tubular operating rod 169 the movement of which is controlled by the mechanism within the housing 22 in a manner to be described presently.

Above the sleeve portion 167 of the adapter 163 there is a connecting sleeve 170, FIGURE 20, of good conducting material and within it there is slidably mounted an auxiliary contact tubular operating rod 171 which, like the operating rod 169, is controlled by the mechanism within the housing 22. A filler plug 172 is carried by the auxiliary contact operating rod 171 for preventing excessive lateral motion of the rod 171 when it comes to a sudden stop on opening of the interrupter 23 or on closing against the mechanical resistance or friction of auxiliary stationary contacts.

FIGURE 21 shows a part of the construction of the load current interrupter 23 at the other end. It will be observed here that an end stationary main contact 173 is provided which corresponds to the main contact 164 previously described. It includes contact fingers 174 which are biased inwardly by the fingers of a contact spring 175. Their inward movement is limited by a ring 174'. The main contact 173 is telescoped in a hollow boss 176 which is cast integrally with the terminal plate 157. A set screw 177 secures the main contact 173 in place in the boss 176.

Above the boss 176 there is another hollow boss 181, FIGURE 19, which is formed integrally with the terminal plate 157. Inwardly thereof is an integral sleeve 182 within which is telescoped an end stationary auxiliary contact 183. It includes contact fingers 184 which are biased inwardly by a surrounding contact spring 185. Set screws 186 are threaded radially into the sleeve 182 and serve to hold the end auxiliary contact 183 in place. The arrangement is the same as shown in FIGURE 23 although that is a view along the line 23—23 of FIGURES 20 and 22.

It was pointed out hereinbefore that the load current interrupter 23 is made up of a plurality of interrupter units 156. Generally, they are of duplicate construction and a description of one will suffice for all of them. As shown in FIGURE 18 each of the interrupter units 156 includes a hollow insulator bushing or housing 187 at the ends of which bushing flanges 188 and 189 are provided. Where the bushing flanges 188 and 189 adjoin, they form an intermediate terminal between the end terminals provided by the terminal plate 157 and the adapter 163. The radial skirts 187' on the insulator bushings 187 are shaped to permit either horizontal or vertical mounting of the interrupters 23. The bushing flanges 188 and 189 are secured to each other by bolts 190, FIGURE 23, intermediate the ends of the load current interrupter 23 and by such bolts to the terminal plate 157 at the left end and the adapter or end terminal member 163 at the right end. The several insulator bushings 187 constitute an insulating housing which is interposed between the mechanism housing 22 and the line terminal 20 for enclosing the main and auxiliary parallel connected contacts.

It is desirable that there be a uniform distribution of the voltage between the terminals of the load interrupter 23 when the contacts thereof are open. Where two units 156 are employed, half the voltage between these terminals should be applied to each unit. For this purpose voltage dividing resistors 191, FIGURES 18, 21 and 22, are employed. They may be cylindrical in shape and formed of semi-conducting material. For example, each may have a resistance of 2 megohms at 10 kv., 60 cycles and be capable of dissipating 50 watts. Instead of a single resistor, a number of parallel connected resistors can be used which provide essentially the same operating characteristics. At one end the resistor 191 is connected by spring contact fingers 192 to a cylindrical flange 193 of a contact socket 194 which is threaded into the respective bushing flange 188. Telescoped with each contact socket 194 is a contact flange member 195 which is secured thereto by screws 195'. At the other end of each resistor 191 is connected by another set of spring contact fingers 192 to a cylindrical flange 196 formed integrally with the respective bushing flange 189. It will be apparent that the voltage dividing resistors 191 are connected between the intermediate terminal formed by the juxtaposed bushing flanges 188 and 189 and the end terminals provided by the plate 157 and the adapter 163. When additional units 156 are used, the voltage between the end terminals of the interrupter 23 will be correspondingly divided between them and the intermediate terminals.

The main current carrying contacts include a main movable contact 197 which has cylindrical contact portions 198 and 199 at its ends. As shown in FIGURES 21 and 22 the movable contacts 197 are located within the voltage dividing resistors 191. For the construction shown in FIGURE 22, the contact portion 198 engages the contact fingers 165 of the end stationary main contact 164 that is carried by the adapter 163. If the interrupter unit 156 were an intermediate rather than a unit at the right hand end, the contact portion 198 of such a unit would engage contact fingers 200, FIGURE 21, at the left end of an intermediate stationary main contact, shown generally at 201, which, as shown in FIGURE 22, has contact fingers 202 that engage the contact portion 199 at the left end of the main movable contact 197 of the unit 156 shown in FIGURE 22. The contact fingers 200 and 202 may be each 6 in number with the former being offset from the latter 30°. The contact fingers 200 and 202 are biased into good contact engagement with the contact portion 199 by fingers of a surrounding contact spring 203. Rings 200' and 202' limit the inward movement of the contact fingers 200 and 202, respectively, in the absence of the contact portions 198 and 199. The intermediate stationary main contact 201 and its surrounding contact spring 203 are loosely mounted within the flange 193 and socket 194 attached to the bushing flange 188 and within the cylindrical flange 196 that is integral with the bushing flange 189. The intermediate stationary main contact 201 and the surrounding contact spring 203 are held in place by radially inwardly extending detents 204, FIGURE 22, from a stop ring 205 which is telescoped within the contact flange member 195 and is held in place by it and the contact socket 194. The detents interfit between the fingers of the contact spring 203 and the fingers 200 of the main contact 201 and resist endwise movement thereof. A self aligning contact construction is provided by this arrangement.

The main movable contacts 197, FIGURES 21 and 22, when in engagement with the end stationary main contacts 164 and 173 and the intermediate stationary main contact 201 interconnect the end terminals provided by the plate 157 and the adapter 163 and provide a high current conducting path therebetween. Under conditions of momentary high current flow or flow of short circuit current, a substantial amount of heat is generated particularly where contact is made with the contact fingers 165, 174, 200 and 202. Provision is made for supporting the main movable contacts 197 and operating them such that the support is substantially unaffected by the heat thus developed and they are maintained in insulated spaced relation in the open circuit position such that there is no likelihood of arcing over therebetween under normal operating conditions.

The main movable contacts 197 are generally tubular with their intermediate portions reduced in diameter and they are telescoped over an operating member 206 in the form of a rod of insulating material which is not only flexible but is strong in tension and compression. The main movable contacts 197 float on the operating member 206 and are held in place in spaced relation thereon, in part, by insulating collars 207 which are secured to the operating member 206 by epoxy cement 208. Annular shock absorbing members 209 are interposed between the insulating collars 207 and the adjacent ends of the main movable contacts 197. Preferably the annular shock absorbing members 209 are formed of O rings of rubber like material. The right hand end of the main movable contact 197, FIGURE 22, is held in place on the insulating operating member 206 by a metallic collar 210 which, like the collars 207, is secured to the operating member 206 by epoxy cement 211. A shock absorbing member 209 is interposed between the metallic collar 210 and the adjacent end of the main movable contact member 197. Since the contacts 197 float on the operating member 206 between the shock absorbing members 209, some independent longitudinal movement thereof is permitted which allows the operating mechanism to overcome individually the static starting friction of each of the contacts 197 instead of simultaneously for all of them.

It will be observed that the metallic collar 210 is threaded at 212 onto the adjacent end of the main contact operating rod 169 and that a clamp nut 213, also threaded on the main contact operating rod 169, serves to secure the metallic collar 210 in position. At the right hand end of the main contact operating rod 169 there is threaded a cross head 214 having trunnions 215 projecting therefrom for connection to the operating mechanism within the mechanism housing 22, to be described.

As pointed out above on flow of momentary heavy current or flow of short circuit current substantial heat is developed, particularly where the main movable contacts 197 engage with the contact fingers 165, 174, 200 and 202. It will be noted that the main movable contacts 197 float on the insulating operating member 206 and that the collars 207 and 210, which secure the main movable contacts 197 in place, are secured by the epoxy cement 208 and 211 at locations well spaced from the ends of the main movable contacts 197. The annular shock absorbing members 209, since they are formed of insulating material, provide an additional heat barrier to protect the cement 208 and 211 from the heat generated under these abnormal operating conditions.

While the end stationary main contacts 164 and 173 are firmly held in position, as described above, the intermediate main stationary contact 201 is loosely mounted but is held against endwise movement by the detents 204. Since the operating member 206, on which the main movable contacts 197 are mounted is flexible, a self aligning contact construction is provided which is capable of accommodating some degree of misalignment and thus does not require a high degree of accuracy in the fitting of the various parts.

The main movable contacts 197 are subjected to considerable shock when movement thereof is initiated from either the open or the closed position and likewise when they are arrested in either the open or the closed position. Some of this shock is absorbed in the inherent resiliency of the operating member 206. The annular shock absorbing members 209 also cushion the shock incident to the starting and stopping of the main movable contacts 197.

When the main movable contacts 197 are operated to the open circuit position, the main movable contact 197, FIGURE 21, telescopes with the intermediate stationary main contact 201 while the other main movable contact 197 telescopes with the end stationary main contact 164. The contacts 197 are spaced apart by the portion of the insulating operating member 206 therebetween and thus an air gap is provided in the circuit previously bridged by the respective main movable contact 197. The length of these air gaps is such as to prevent arc over in the open circuit position under normal operating conditions. In addition, the voltage dividing resistors 191 bridge the respective gaps and thus insure that the voltages applied to the respective gaps will be in accordance with the values of the resistance of the resistors 191.

When it is desired to employ more than two interrupter units 156, additional units of the construction shown in FIGURES 19 and 21 are added. In addition a longer operating member 206 is used and additional main movable contacts 197 are secured thereon by insulating collars 207, in the manner previously described, having annular shock absorbing members 209 therebetween. For example, if four units 156 are employed, there would be four main movable contacts 197 mounted on an operating member, such as the operating member 206, but correspondingly longer to accommodate the additional contacts 197.

It is desirable that the space occupied by the stationary contacts 164, 173 and 201 and by the main movable contacts 197 be free of contamination by the products of the arc which are developed as the result of opening of the circuit by the auxiliary contacts to be described in detail presently. For this purpose, as shown in FIGURES 21 and 22, annular sealing gaskets 216 are located in overlying relation to the contact flange members 195. It will be observed that the sealing gasket 216 at the left end of FIGURE 21 is juxtaposed to the terminal plate 157 while the sealing gasket 216 at the left end of FIGURE 22 is juxtaposed to the bushing flange 189.

It is desirable that the magnetic forces resulting from the flow of current be directed in such manner that the contact pressure applied to the cylindrical contact portions 198 and 199 of the main movable contacts 197 be increased with increasing current. It will be observed that the contact fingers 165 and 174 of the end stationary main contacts 164 and 173 and the contact fingers 200 and 202 of the intermediate stationary main contact 201 surround the respective contact portions 198 and 199. When current flows through these contact fingers, the magnetic forces resulting from such current flow tend to cause the contact fingers to move radially inwardly and thus to grip the contact portions 198 and 199 with increased pressure. This effect can be described as a magnetic blow-on effect for the reason that it increases with increase in the magnitude of the current flow.

It will be understood that each of the main contacts and the gap provided thereby in open circuit condition has in parallel therewith an auxiliary contact and a corresponding gap when the interrupter 23 is in the open circuit position. The respective gaps are in series and the parallel connections are provided by the terminal plate 157 at the left end, the adapter 163 at the right end and the bushing flanges 188—189 intermediate the ends. Whether two or four or more interrupter units 156 are employed, the same general series parallel arrangement of the contacts and resulting gaps is employed together with voltage dividing resistors across the sets of parallel gaps to insure that the voltage distribution during open circuit conditions is maintained across the series connected gaps.

The description of the auxiliary contacts now will be completed with reference to FIGURES 19 and 20 of the drawings. Where the same elements are employed, the same reference characters are used. Because of the necessity for connecting the right hand interrupter unit 156, FIGURE 20, to the operating mechanism, it necessarily is slightly different from the other interrupter units. These differences will be pointed out as the description proceeds.

Referring now to FIGURE 20 of the drawings and to the right hand end thereof it will be noted that a cross head 219 is threaded onto the end of the auxiliary contact operating rod 171 which is in the form of a tube. The cross head 219 is provided with oppositely extending trunnions 220 to make connection to the operating mechanism. It is desirable that the parts of the auxiliary contacts which are movable with the auxiliary contact operating rod 171 be aligned in a predetermined fashion. This alignment will be made more clear by reference to the cross sections shown in FIGURES 24–30 which show the actual axial locations of the several parts which, in the interest of clarity, are shown in FIGURES 19 and 20 as being either in the plane of the paper or at right angles thereto. It will be noted in FIGURE 30 that the cross head 219 and the trunnions 220 are positioned along a vertical axis and this axis should be kept in mind as the axis of reference for the parts of the auxiliary contacts which are movable on movement of the auxiliary contact operating rod 171.

Again referring to FIGURE 20 it will be noted that an auxiliary movable contact, shown generally at 221, is connected immediately to the left end of the rod 171. The contact 221 includes an auxiliary contact tip 222 which, as shown in FIGURE 24, is provided with contact tip portions 222′ for engagement with contact fingers to be described and providing vent passageways between the contact portions for the escape of the products of the arc to a vent passage and thence to the atmosphere.

The auxiliary movable contact 221 has a shank 223 which is connected by a bayonet joint, shown generally at 224, to the operating rod 171. The bayonet joint 224 facilitates detachment of the operating rod 171 from the remaining movable parts and thus permits replacement or repair without requiring dismantling of the operating rod 171.

The construction of the bayonet joint 224 includes a plug 225 that is secured by pins 226 extending at right angles to each other to the rod 171. FIGURE 30 shows the arrangement in more detail. Telescoped with the shank 223 and an extension of the plug 225 is a sleeve 227 which is secured to the shank 223 by a pin 228, FIGURE 28. The upper end of the pin 228 projects through a slot 229 in a bayonet sleeve 230 which is employed for preventing relative rotation between the auxiliary movable contact 221 and the operating rod 171. A pin 231 extends through the plug 225 and through suitable slotted openings in the sleeve 227 for detachable connection thereto. The ends of the pin 231 project through the slot 229 in the sleeve 230 and a slot 232 on the underside thereof. Locking pins 233 extend axially of the shank 223 and the plug 225 for holding the transverse pins 228 and 231 securely in the position shown. On sliding the bayonet sleeve 230 to the left, the ends of the pin 231 are freed and relative rotation is permitted between the auxiliary movable contact 221 and the operating rod 171 to uncouple them or to couple them together as the case may be.

Previously, with reference to FIGURE 19, the construction of the end stationary auxiliary contact 183 has been described. That contact is mounted in a sleeve 182 that is formed integrally with the terminal plate 157. The bushing flange 189, which forms a part of the intermediate terminal between the ends of the interrupter 23, is provided with a sleeve 237 which corresponds to the sleeve 182. Secured to the sleeve 237, FIGURE 20, is an auxiliary stationary contact 183 which is constructed identically with the auxiliary contact shown in FIGURE 19 and mounted on the terminal plate 157. The auxiliary contact 183, shown in FIGURE 20, includes contact fingers 184 which are biased inwardly by the fingers of a contact spring 185. These contact fingers 184 are arranged to engage the outer surface of the contact tip 222 of the auxiliary movable contact 221 in the closed circuit position.

Provision is made for quickly and efficiently extinguishing the arc that is drawn on separation of the contact tip 222 from the contact fingers 184. It will be understood that the construction shown in FIGURES 19 and 20 provides for the formation of two arcs in series resulting in two gaps in the circuit when the arcs are extinguished. Identical constructions are employed for arc extinguishing purposes.

It will be observed that the contact tip 222 is arranged to be drawn into a bore 238 of a lining 239 which may be formed of a stack of fiber washers which evolve an arc extinguishing medium when subjected to the intense heat of an arc. The lining 239 is mounted within an insulating sleeve 240 that may be formed of a phenolic condensation product. The lining 239 is held in position at the right end of the sleeve 240 by a metallic retainer 241. Preferably the metallic retainer 241 is secured to the sleeve 240 by epoxy cement 242. At the other end of the sleeve 240 there is a fiber retainer 243 which is secured in position by epoxy cement 244. As shown in FIGURES 25 and 27 the fiber retainer 243 is provided with recesses 245 which register with the contact portions 222′, FIGURE 24, of the auxiliary contact tip 222. This arrangement acts to confine the arc that is drawn to the contact portions 222′ and the evolution of arc extinguishing material from the surfaces of the recesses 245. It will be observed in FIGURE 24 that the contact fingers 184 are located centrally of the contact portions 222′ thus placing them also in registry with the recesses 245.

Since repeated operation may damage the lining 235 such as to require its replacement, it is constructed and arranged in such manner that it can be replaced readily. It will be understood that the lining 239, surrounding sleeve 240 and retainers 241 and 243, together comprise a cartridge 246 which can be replaced as a unit should the occasion arise.

At the right hand end the cartridge 246 telescopes over a sleeve 247 that is formed integrally with the bushing flange 189. An O ring 248 provides a sealed connection between the radially extending flange of the metallic retainer 241 and an adjacent shoulder of the sleeve 247. This sealed connection prevents escape of the arc products into the space within the insulator bushing 187 from the right end of the bore 238. Another O ring 249 at the left end of the cartridge 246 is interposed between a shoulder of the fiber retainer 243 and a shoulder of a surrounding insulating housing 250, preferably formed of a phenolic condensation product, to provide a sealed connection at this end.

At the left end of the cylindrical insulating housing 250, FIGURE 20, screws 251 extend radially inwardly into a metallic exhaust chute 252. The actual positioning of the screws 251 is shown in FIGURE 24.

The metallic exhaust chute 252 has an elongated cylindrical throat portion 252′ which restricts the flow of arc extinguishing gas that is particularly advantageous for interrupting low current arcs. The metallic exhaust chute 252 has an outflared throat portion 253 which discharges into a vent space 254 within the bushing flange 188. This vent space is closed off either by the adjacent bushing flange 189 for the intermediate terminal or by the terminal plate 157 for the end terminal shown in FIGURE 19. It is highly desirable that the space 254 be in free communication with the atmosphere and further that this vent space be sealed away from the main contacts previously described. The reason for this is to limit the space that is contaminated by arc products and thus reduce the likelihood of arc over once the circuit has been interrupted.

As shown in FIGURE 23 the metallic exhaust chute 252 includes a rectangular flange 255 that is secured by bolts 256 to the bushing flange 188.

Referring again to FIGURE 20 it will be noted that the exhaust chute 252 has a cylindrical portion 258 surrounding the contact fingers 184 and communicating with the slots therebetween and through the recesses 245 with the bore 238. It will be understood that, when the contact tip 222 of the auxiliary movable contact 221 is withdrawn into the bore 238, the arc products can flow readily therefrom through the recesses 245, past the slabbed off portions of the contact tip 222, FIGURE 24, between the contact portions 222′ and through the slots between the contact fingers 184 to the cylindrical portion 258 of the exhaust chute 252. Then the products flow freely through the flared throat portion 253 to the vent space 254. As shown in FIGURE 23 the vent space 254 communicates with the atmosphere through vents 259 which have discharge openings 260 that are provided with screens 261 to prevent the discharge of solid particles. It will be understood that the location of the vents 259 will depend upon whether the interrupter 23 is mounted horizontally, as shown in the drawings, or is mounted vertically. If a vertical mounting is employed, the vents 259 are turned so as to discharge downwardly and thus prevent the entrance of moisture, etc., into the vent space 254.

As pointed out, the positioning of the recesses 245 in the fiber retainer 243 with respect to the contact fingers 184 and contact portions 222′ is important. In order to maintain the proper relationship a locating pin 262, FIGURES 20, 25 and 27, is used. It is threaded into the metallic exhaust chute 252 and projects into a suitable opening 262′ in fiber retainer 243.

It is desirable that the arc which is drawn on movement of the auxiliary movable contact 221 out of engagement with the stationary contact fingers 184 be further confined within the bore 238. For this purpose a trailer construction is employed which moves with the movable contact 221. In addition advantage is taken of the trailer construction to provide a connection to the movable auxiliary contact of the next unit. This will be described presently.

Referring now particularly to FIGURES 20, 24, 25 and 27, it will be observed that a trailer rod 266 of insulating material is employed. Preferably the trailer rod 266 is formed of the same material as the operating member 206 on which the main movable contacts 197 are mounted.

The right end of the trailer rod 266 is telescoped within the contact tip 222 and it has a metallic sleeve 267 thereover which is cemented thereto. The reason for employing the metallic sleeve 267 is to permit the trailer rod 266 to be drilled for receiving a transverse pin 268 the actual position of which is indicated in FIGURE 27. The transverse pin 268 extends into the walls of the auxiliary contact tip 222 and provides the necessary mechanical connection between the auxiliary movable contact 221 and the trailer rod 266. In order to protect the trailer rod 266 from the heat of the arc an insulating sleeve 269 is telescoped over the metallic sleeve 267 and the portion of the trailer rod 266 where it projects beyond the arcing end of the auxiliary contact tip 222. The insulating sleeve 269 extends into a tubular trailer 270 that is formed of material, such as methylmethacrylate resin, from which an arc extinguishing medium is evolved when it is subjected to the intense heat of an electric arc. It will be understood that the trailer 270 is drawn into the bore 238 with the result that the arc which is formed between the auxiliary contact tip 222 and one or more of the contact fingers 184 is confined between the exterior surface of the trailer 270 and the bore 238 and because of this confinement is quickly extinguished.

As shown in FIGURE 19 the trailer rod 266 extends entirely through the tubular trailer 270 and through a trailer stop sleeve 271. The trailer stop sleeve 271 is preferably formed of resilient insulation to give shock resistance. The space between the trailer rod 266 and the inner surface of the tubular trailer 270 is sealed off by an O ring 272. The O ring seal 272 prevents the flow of products incident to the arc through the tubular trailer 270.

As indicated hereinbefore the trailer rod 266 is employed to provide a mechanical connection to one or more additional auxiliary movable contacts to effect conjoint movement thereof so that two or more gaps are provided in the circuit for facilitating interruption of the current flow. It is for this purpose that the trailer rod 266 extends well beyond the tubular trailer 270 and has telescoped therewith a trailer hitch socket 273 that is formed preferably of metal and is adhesively secured to the trailer rod 266. Extending transversely through the trailer rod 266 and trailer hitch socket 273 is a trailer hitch pin 274 the actual position of which is illustrated in FIGURE 26. The trailer hitch pin also extends through a moving contact extension 275 in the form of a metallic tube which is telescoped at its right end over the trailer hitch socket 273. At its left end the moving contact extension 275 is telescoped with a sleeve portion 276 of an auxiliary movable contact 277 which otherwise corresponds to the auxiliary movable contact 221 previously described. The connection between the left end of the tubular moving contact extension 275 and the sleeve portion 276 of the auxiliary movable contact 277 is formed by brazing as indicated at 278. The contact tip 279 of the auxiliary movable contact 277 corresponds in every detail with the contact tip 222 and, as shown in FIGURE 19, it is engaged by the contact fingers 184 in the circuit closed position.

It will be appreciated that the auxiliary movable contact 277 is provided with a trailer construction that is similar to the trailer construction for the auxiliary movable contact 221. For this purpose a transverse pin 280 is provided the actual position of which is shown in FIGURE 25. The transverse pin 280 serves to mechanically interconnect a second trailer rod 266 and a second tubular trailer 270 in the manner previously described. Where additional interrupter units 156 are employed, additional auxiliary contacts 277 are utilized and they are interconnected in the manner described. It is for this purpose that the trailer rod 266 shown at the left of FIGURE 19 is provided with suitable connecting means for connection to another auxiliary movable terminal.

It will be appreciated that the current flow through contact fingers 184 of the auxiliary contacts 183 to the auxiliary movable contacts 221 and 277 is such as to increase the contact pressure therebetween as a function of the magnitude of the current flow.

It is desirable that a similar connection be provided between the auxiliary movable contact 277 and the intermediate terminal provided by the bushings 188—189 during the circuit opening operation. Since the connection to the intermediate terminal provided by the bushings 188—189 is outward rather than inward, provision is made for so directing the current flow during the circuit interrupting operation that the contact pressure or blow-on effect resulting from the magnetic field is such as to provide the increased pressure.

As shown in FIGURES 19 and 26 a moving contact metallic sleeve 283 is telescoped with the moving contact extension 275 and it has a friction fit therewith at its right hand end. It extends to the left for a substantial distance where it is brazed at 284 to a contact follower 285 which has integrally formed contact fingers 286 that extend to the right over the metallic sleeve 283 and into resilient contact engagement with the inner surface of the sleeve 247 that is formed integrally with the bushing 189. Since the current is required to flow in a reverse loop, the net result is to cause the contact fingers 286 to tend to move outwardly and exert a pressure on the inner surface of the sleeve 247 which depends upon the magnitude of current flow. In this manner the blow-on effect is maintained during circuit opening operation.

As the auxiliary movable conacts 221 and 277 are moved to the right during the circuit opening operation, the contact fingers 286 moves therewith beyond the sleeve 247 and into engagement with the inner surface of the auxiliary contact 183 a portion of which is shown at the right side of FIGURE 19. In order to bridge the inner surface of the sleeve 247 and the inner surface of the auxiliary contact 183 so that a symmetrical construction can be provided for the bushing flange 189, a conducting ring 287 is provided. It has a snug fit with the respective bushing flange 189.

With a view to holding the moving contact sleeve 283 and the associated contact follower 285 in position on the moving contact extension 277 a retainer sleeve 288 is provided in endwise alignment therewith between it and a shoulder on the contact tip 279. As shown in FIGURE 26 the retainer sleeve 288 is slotted lengthwise as indicated at 289 to facilitate its being expanded so as to telescope over the contact follower 285 and permit disassembly of the movable parts.

The transverse pin 280 which mechanically inter-connects the trailer rod 266, shown at the left of FIGURE 19, with the auxiliary movable contact 277 is removably held in place by the retainer sleeve 288. The pin 280 has a reduced diameter end 290 which extends through a reduced portion of the slot 289 in the retainer sleeve 288. When this sleeve is removed, as described, it is possible to remove the transverse pin 280.

At the right end of the moving contact extension 275 the trailer hitch pin 274 has a reduced diameter end portion 291, FIGURE 26, which projects into a longitudinally extending slot 292 in the moving contact metallic sleeve 283. This construction holds the trailer hitch pin 274 in place and also prevents rotation of the metallic sleeve 283 and contact follower 285 attached thereto.

As indicated hereinbefore it is desirable that the vent space 254 through which the arc products discharge be sealed off from the interior of the insulator bushings 187. For this purpose an O ring seal 293 is provided between a radially outwardly extending flange of the metallic exhaust chute 252 and the flange 257 of the bushing flange 188. This construction is shown at the left hand of each of FIGURES 19 and 20.

It will be understood that the reverse turn contact construction provided by the metallic sleeve 283 and contact follower 285 is provided for each of the intermediate terminals of the interrupter 23. However, at the right end of the interrupter 23 reliance is placed entirely on the conductivity of the auxiliary contact operating rod 171 to complete the circuit to the mechanism housing 22 through the metallic parts connected therewith which serve to operate the rod 171. Since the current flow here is only momentary and since the conducting path through the various parts is relatively good, it is unnecessary to provide a construction at the right end of the auxiliary circuit interrupting contacts, FIGURE 20, similar to that for the intermediate terminal. However, such construction can be employed throughout if desired.

The operating mechanism for the load current interrupter 23 is located within the housing 22 and is shown in more detail in FIGURES 34, 35, 36 (sheet 10) and 37, of the drawings. As shown in FIGURES 34 and 37, bolts 300 are provided for securing the adapter 163 in place on the mechanism housing 22. Contact plugs 301 are secured to the wall of the housing 22 and project into suitable contact fingers 302 mounted on the adjacent wall of the adapter 163 in order to provide a low resistance current conducting path therebetween. Also these figures show the attachment of the bracket 91 to the housing 22 by bolts 303.

Interposed between the mechanism housing 22 and the adapter or end terminal member 163 is a conducting gasket 304 to provide an additional conducting path in parallel with that provided by the contact plugs 301 and contact fingers 302. Tests have shown that the conducting gasket 304, which also seals the junction between the mechanism housing 22 and the adapter 163, by itself provides a satisfactory connection. Accordingly, the contact plugs 301 and contact fingers 302 can be omitted. The conducting gasket 304 preferably is formed of conducting mesh, such as aluminum wire mesh, embedded in a flexible resilient body such as neoprene rubber.

FIGURE 35 shows an insulator flange 304' which is mounted on and rotates with the second insulator 17. It includes an upstanding sleeve 305 for receiving the lower end of the shaft 21 and it is keyed thereto by a key 306.

Mounted for rotation with the shaft 21 near its upper end by means of a key 309 is a mechanism cam 310 which is shown in FIGURES 39 and 40. The cam 310 is the only part within the housing 22 which rotates conjointly with the shaft 21. Several of the other parts referred to hereinafter are rotatably mounted on the shaft 21 below the mechanism cam 310.

The mechanism cam 310 controls the operation of the mechanism within the housing 22. For this purpose it is provided with trip detents **310*a*, 310*b*, 310*c* and 310*d*. As will appear hereinafter these trip detents are used for effecting the operation of the load current interrupter 23 when the switch blade 25 approaches the line contact member 19 to various positions and then is reversed. The mechanism cam 310 is provided with corresponding pry out detents 310*a'*, 310*b'*, 310*c'* and 310*d'***.

When the switch blade 25 has been fully closed, the relative positions of the parts within the mechanism housing 22 are as shown in FIGURE 34. On rotation of the shaft 21 and therewith the mechanism cam 310 in a counterclockwise direction to effect opening of the circuit, the trip detent **310*a* engages a shoulder 311 of a latch arm 312 which, as shown in FIGURE 35, is rotatably mounted on a hub 313 of a main latch 314 that in turn is rotatably mounted on a stud 315 which is threaded into the underside of a boss 316 that is cast integrally with the mechanism housing 22. A spring 317 cooperates with the main latch 314 to bias it is a counterclockwise direction while a tension spring 318 reacts between the latch arm 312 and the main latch 314 to bias the former toward the latter. This arrangement provides a ratcheting effect to permit the movement of the trip detents 310*a–d* past the shoulder 311 when the mechanism cam 310 is rotated in a clockwise switch closing direction. The latch arm 312 has a shoulder 319 which engages a detent 320 on the main latch 314 to effect conjoint movement therewith in a clockwise direction on engagement of the shoulder 311 by any one of the trip detents 310*a–d***.

Near its outer end the main latch 314 has a shoulder 321. The shoulder 321 engages a shoulder 322 on a detent 323 which extends upwardly from a main operating arm 324, FIGURES 47, 48, and 49, that has a hub portion 325 which is journaled on the shaft 21. At its outer end the main operating arm 324 has a bifurcated end portion 326 that is provided with apertures 327 for receiving pins 328, FIGURE 38, that are connected by links 329 to trunnions 215 of the cross head 214 which is connected to and moves conjointly with the main contact operating rod 169. The operating rod 169 is tubular and it telescopes with a stationary guide rod 330 which is secured at 331 to a wall of the mechanism housing 22. It will be understood that the main operating arm 324 directly controls the movement of the main contact operating rod 169 which, in turn, controls the movement of the main movable contacts 197 of the load current interrupter 23.

The movement of the main operating arm 324 is effected by a main spring which comprises an outer spring 332 and an inner spring 333 as shown more clearly in FIGURES 35 and 37 of the drawings. The upper ends of the outer and inner spring 332 and 333 are turned inwardly to interfit with sockets 334 and 335 on the under side of the main operating arm 324 as shown more clearly in FIGURE 49. The lower ends of the outer and inner springs 332 and 333 interfit with sockets 336 and 337 in an operating spring base 338 that is shown more clearly in FIGURES 37 and 43 of the drawings. The operating spring base 338 is rotatably mounted on the shaft 21 and is held in position within the mechanism housing 22 by a bolt 339, FIGURE 35. It will be understood that the operating spring base 338 can be variably positioned about the shaft 21 in order to vary the preloading tension of the outer and inner springs 332 and 333. Spring holders 340 and 341 cooperate with the upper and lower end turns of the outer and inner springs 332 and 333 to hold them in position with respect to the main operating arm 324 and the operating spring base 338. It will be understood that a single spring can be used in lieu of the outer and inner springs 332 and 333. However, the use of the two springs permits a more compact construction than is possible if a single spring is employed to give the same torque output.

Immediately above the hub portion 325 of the main operating arm 324, FIGURE 35, is a prestressed auxiliary spring 343 which can be connected at its lower end to the upper side of the main operating arm 324, FIGURE 47, at one of the locations 344 and at its upper end at 345 to the under side of an auxiliary operating arm 346, FIGURES 44, 45 and 46, which has a hub portion 347 that is journaled on the shaft 21. As shown more clearly in FIGURE 45 of the drawings, the outer end 348 of the auxiliary operating arm 346 is bifurcated and has apertures 349 to receive pins 350, FIGURE 38, that are connected by links 351 to the trunnions 220 of the cross head 219 which is connected to and moves conjointly with the auxiliary contact operating rod 171. The operating rod 171 is tubular and it telescopes with a stationary guide rod 352 which is secured at 353 to a wall of the mechanism housing 22. It will be understood that the auxiliary contacts 221 and 277 are moved conjointly with the auxiliary contact operating rod 171 and, since it is connected by the links 351 and pin 350 to the auxiliary operating arm 346, the auxiliary contacts 221 and 277 move conjointly with the auxiliary operating arm 346.

In order to hold the auxiliary operating arm 346 in the position shown in FIGURE 34 of the drawings corresponding to the closed positions of the auxiliary movable contacts 221 and 277, a pin 354, FIGURES 35 and 45, depends therefrom for engagement with a detent 355 of an auxiliary latch 356 which includes an integral sleeve 357, FIGURE 36 (sheet 10), that is rotatably mounted on a shaft 358 which is carried by bosses 359 and 360 that are formed integrally with the mechanism housing 22. A spring 361, wound around the sleeve 357, cooperates with the auxiliary latch 356 to rock it in a clockwise direction, as viewed in FIGURE 34, for holding the detent 355 in the path of the depending pin 354 on the auxiliary operating arm 346. One end 362 of the spring 361 bears against a tail piece 363 that forms a part of the auxiliary latch 356 and serves to bias it against an adjusting screw 364 which is employed for changing the position of the auxiliary latch 356 as may be required. The other end 365 of the spring 361 bears against the inner surface of the mechanism housing 22. A stop arm 366 is formed integrally with the auxiliary latch 356 to limit its movement in a counterclockwise direction when it is operated to the unlatched position.

Provision is made for swinging the auxiliary latch 356 to remove the detent 355 from the path of the pin 354. For this purpose a flange 367 depends from the under side of the auxiliary latch 356 to provide a track along which a pin 368 rides. The pin 368 is carried by the main operating arm 324, FIGURE 48, and is arranged to ride over a cam portion 369 when it has been swung through a substantial portion of its opening movement to cause the auxiliary latch 356 to rock in a counterclockwise direction, FIGURE 34, and move the detent 355 out of the path of the pin 354. The prestressed auxiliary spring 343, which is further stressed by the movement of the main operating arm 324 to the position where the auxiliary latch 356 is operated, then is free to urge the auxiliary operating arm 346 in a clockwise direction, FIGURE 34, to move the auxiliary contact operating rod 171 and therewith the auxiliary movable contacts 221 and 277 to effect interruption of load current flow.

It is desirable to insure that the auxiliary operating arm 346 rotates to open the auxiliary movable contacts 221 and 277 which might become frozen under certain operating conditions. Also, it is desirable to impart some of the kinetic energy of the main movable contacts 197 and parts that move therewith to the auxiliary movable contacts 221 and 277 in order to accelerate them at a rate in excess of that at which they would be accelerated by the auxiliary spring 343 alone. For this purpose a link 370 is pivoted on a pin 371, FIGURE 48, that is carried by the main operating arm 324. The link 370 has an elongated slot 372 through which a pin 373, extending downwardly from the auxiliary operating arm 346, FIGURE 45, projects. It will be understood that the auxiliary operating arm 346 and parts movable therewith are accelerated further, when the outer end of the slot 372 picks up the pin 373 and effects conjoint movement of the auxiliary operating arm 346 with the main operating arm 324.

There is the possibility that the main movable contacts 197 may become frozen in the closed position. If this should occur, there is a possibility, when the main latch 314 is moved out of engagement with the shoulder 322 on the detent 323 which extends upwardly from the main operating arm 324, that the springs 332 and 333 would be incapable of breaking the main movable contacts 197 loose from the corresponding stationary contacts. In accordance with this invention provision is made for insuring that the main movable contacts 197 are broken loose by providing a direct mechanical connection thereto from the shaft 21. For this purpose a pry out cam 374, FIGURES 41 and 42, is rotatably mounted on the shaft 21. It has a pry out surface 375 which is arranged to engage a shoulder 376, FIGURES 34, 47 and 48, on the detent 323 which is carried by and forms a part of the main operating arm 324. On the opposite side of the pry out cam 374 there is a cam surface 377 with which a roller 378 engages. The roller 378 is rotatably mounted on a pin 379, FIGURE 36 (sheet 10), which extends between arms 380 that project radially from a sleeve 381 that forms a part of a pry out lever which is shown, generally, at 382. The sleeve 381 is rotatably mounted on a shaft 383 which is carried by bosses 384 and 385 that are cast integrally with the mechanism housing 22. A spring 386, which surrounds the sleeve 381, cooperates with the pry out lever 382 to bias it in a counterclockwise direction as viewed in FIGURE 34. An adjusting screw 387 is arranged to position the pry out lever 382 in the desired location. A tension spring 388 is strained between the pin 379 and a pin 389 on the pry out cam 374 to retrieve it.

The pry out lever 382 is also provided with another pair of arms 390 between which a pry out finger 391 is rotatably mounted on a pin 392. Surrounding the pin 392 is a spring 393 which reacts against the pry out finger 391 to rotate it in a clockwise direction with respect to the pry out lever 382. The position of the pry out finger 391 relative to the pry out lever 382 can be adjusted by a screw 394.

It will be noted that the pry out finger 391 has a shoulder 395 at its outer end which is located in the path of the pry out detents 310*a'–d'*. At the time that the trip detent 310*a*, for example, engages the shoulder 311 on the latch arm 312, the pry out detent 310*a'* engages the shoulder 395 on the pry out finger 391. The continued rotation of the mechanism cam 310 in the counterclockwise direction as indicated by the arrow 396 with the pry out detent 310*a'* in engagement with the shoulder 395 causes the pry out lever 382 to be rocked in a clockwise direction as viewed in FIGURE 34. This shifts the position of the roller 378 in engagement with the cam surface 377 on the rear side of the pry out cam 374 and brings the pry out surface 375 into operative engagement with the shoulder 376 on the detent 323 in the event that the main movable contacts 197 have become frozen and no movement of the operating arm 324 has taken place. The continued movement of the mechanism cam 310 with the pry out detent 310*a'* in engagement with the shoulder 395 acts to break the main movable contacts 197 loose and frees them for movement under the biasing action of the springs 332 and 333.

The main and auxiliary operating arms 324 and 346 continue to rotate in a clockwise direction to effect the movement of the movable main contacts 197 and auxiliary movable contacts 221 and 277 to their fully open positions. The movement of the main and auxiliary operating arms 324 and 346 is arrested, as shown in FIGURE 38, by engagement of faces 397, FIGURE 47, and 398, FIGURE 44, thereof with stop members 399 and 400 of wear resisting material such as brake lining material. The stop members 399 and 400 are commonly mounted on a metallic plate 401 which overlies blocks 402 and 403 of resilient material, such as rubber. Surrounding the guide rods 330 and 352 are tubular stop members 404 and 405 which bear against the plate 401 at one end and have stop rings 406 and 407 of material similar to that of which the stop members 399 and 400 are formed which are engaged by the cross heads 214 and 219. The blocks 402 and 403 bear against a wall of the mechanism housing 22 and absorb the shock incident to the stopping of the main and auxiliary operating arms 324 and 346 and parts movable therewith. By providing for independently arresting the main and auxiliary operating arms and the cross heads 214 and 219, substantially no shearing stress is applied to trunnions 215 and 220 or to the pins 328 and 350. In their final positions the main and auxiliary operating arms 324 and 346 have the faces 397 and 398 coplanar as shown in FIGURE 38. This is permitted because of the lost motion connection provided by the slot 372 in the link 370.

It will be recalled that the continued rotation of the shaft 21, after interruption of the flow of load current by the load current interrupter 23, effects the movement of the switch blade 25 to the open position. During the continued rotation of the shaft 21 in the direction indicated by the arrow 396, FIGURE 34, for opening the switch blade 25, the main contacts 197 and auxiliary contacts 221 and 277 are moved to their closed positions and the springs 332 and 333 are recocked. This is accomplished through the agency of a detent 408 which forms the head of a bolt 409 that is carried by an extension 410 or reclosing arm which is formed integrally with the mechanism cam 310. During the continued rotation of the mechanism 310 in the direction indicated by the arrow 396, the detent 408 engages the shoulder 322 on the detent 323 which is carried by the main operating arm 324. Accordingly, the continued movement of the mechanism cam 310 and reclosing arm 410 in the closing direction effects rotation of the main operating arm 324 in a counterclockwise direction and therewith the auxiliary operating arm 346 since the pin 373 on the latter now engages the inner end of the slot 372 in the same relation as shown in FIGURE 34. The movement continues until the main contacts 197 and the auxiliary contacts 221 and 277 are reclosed. Then the shoulder 321 on the main latch 314 is moved by the spring 317 into latching engagement with the shoulder 322. Since the springs 332 and 333 were recocked by the reverse rotation of the main operating arm 324, the main latch 314 then holds them in this condition and holds the main contacts 197 in the closed positions. As the pin 368, carried by the main operating arm 324, rides over the beveled end surface 411 of the auxiliary latch 356, the latter is raised to permit the pin 368 to engage the under side of the flange 367. The continued movement of the auxiliary operating arm 346 brings the pin 354 into engagement with the beveled approach surface 412 on the back side of the detent 355 and lifts it to permit engagement thereby with the pin 354 under the influence of the spring 361.

The switch blade 25 now is in the full open position and the main contacts 197 and auxiliary contacts 221 and 277 of the load current interrupter 23 are in the closed positions. Further rotation of the shaft 21 in the opening direction is prevented by engagement of the stop shoulder 70 with the stop 72.

When the switch blade 25 is to be reclosed, the shaft 21 is rotated in a clockwise direction, insofar as the mechanism within the housing 22 is concerned, the trip detents 310*a–d* ratchet by the shoulder 311 of the latch arm 312 and likewise the pry out detents 310*a'–d'* ratchet by the shoulder 395 on the pry out finger 391. The initial position of the mechanism cam 310 for the closed position of the switch blade 25 is controlled by the engagement of the stop shoulder 71 with the other side of the stop 72 as shown in FIGURE 10 of the drawings.

During the closing movement of the switch blade 25, should the operator decide to reverse its movement prior to the time when all of the trip detents 310*a–d* have ratcheted past the shoulder 311 on the latch arm 312, then the next trip detent, for example the trip detent 310*c*, will engage the shoulder 311 of the latch arm 312 and effect opening movement of the main contacts 197 and auxiliary contacts 221 and 277. As described hereinbefore the operator 38 compels the lineman to swing the handle 39 to its lowermost position in order to reclose the main contacts 197 and auxiliary contacts 271 and 277 of the load current interrupter 23 and to recock the springs 332 and 333 before another attempt can be made to swing the switch blade 25 to the closed position.

In the illustration just given the pry out detent 310*c'* would function as described hereinbefore for the pry out detent 310*a'* in operating the pry out cam 374.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Switch means comprising, in combination, a line contact member and a line terminal member in insulated spaced relation, a switch blade movable into and out of engagement with said line contact member, current interrupting means interconnecting said line terminal member and said switch blade, said current interrupting means comprising sequentially opening main and auxiliary contact means in parallel circuit relation, spring means for operating said contact means in turn to open position, latch means holding said contact means closed; and operating means connected to said switch blade and to said current interrupting means for tripping said latch means to permit said spring means first to separate said main contact means followed by separation of said auxiliary contact means, then moving said switch blade out of contact engagement with said line contact member, and finally reclosing said contact means and winding said spring means to be held by said latch means during the final portion of the opening movement of said switch blade.

2. Switch means comprising, in combination, a line contact member and a line terminal member in insulated spaced relation, a switch blade movable into and out of engagement with said line contact member, current interrupting means interconnecting said line terminal member and said switch blade, said current interrupting means comprising sequentially opening main and auxiliary contact means in parallel circuit relation, spring means for operating said contact means in turn to open position, latch means holding said contact means closed; operating means connected to said switch blade and to said current interrupting means for tripping said latch means to permit said spring means first to separate said main contact means followed by separation of said auxiliary contact means, then moving said switch blade out of contact engagement with said line contact member, and finally reclosing said contact means and winding said spring means to be held by said latch means during the final portion of the opening movement of said switch blade, and means cooperating with said operating member and preventing reverse operation thereof after said contact means have been separated until the same have been reclosed and said spring means has been rewound and held by said latch means.

3. Switch means comprising, in combination, a line contact member and a line terminal member in insulated spaced relation, a switch blade movable into and out of engagement with said line contact member, current interrupting means including separable contacts interconnecting said line terminal member and said switch blade, spring means biasing said contacts to open position, an operating member movable from one position to another, latch means holding said contacts closed, a plurality of trip detents on said operating member in spaced relation any one of which is arranged to trip said latch means depending upon the extent of movement of said operating member during the initial portion of its movement from said one to the other position corresponding to the extent of previous closing movement of said switch blade in the vicinity of said line contact member to permit said spring means to open said contacts, means interconnecting said switch blade and said operating member for moving said switch blade out of engagement with said line contact member during movement of said operating member from said one to the other position and after said contacts have been opened, and means interconnecting said contacts and said spring means with said operating member for reclosing said contacts and winding said spring means to be held by said latch means during the final portion of the movement of said operating member from said one to the other position.

4. Switch means comprising, in combination, a line contact member and a line terminal member in insulated spaced relation, a switch blade movable into and out of engagement with said line contact member, current interrupting means including separable contacts interconnecting said line terminal member and said switch blade, spring means biasing said contacts to open position, an operating member movable from one position to another, latch means holding said contacts closed, a plurality of trip detents on said operating member in spaced relation any one of which is arranged to trip said latch means depending upon the extent of movement of said operating member during the initial portion of its movement from said one to the other position corresponding to the extent of previous closing movement of said switch blade in the vicinity of said line contact member to permit said spring means to open said contacts, means interconnecting said switch blade and said operating member for moving said switch blade out of engagement with said line contact member during movement of said operating member from said one to the other position and after said contacts have been opened, means interconnecting said contacts and said spring means with said operating member for reclosing said contacts and winding said spring means to be held by said latch means during the final portion of the movement of said operating member from said one to the other position, a pry out member cooperating with said separable contacts for initiating the separation thereof, and a plurality of pry out detents on said operating member corresponding to said trip detents for operating said pry out member, the particular pry out detent employed depending upon the trip detent used to trip said latch means in a given operation.

5. Switch means comprising, in combination, support means; first, second and third insulators mounted on said support means in parallel spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means mounting said switch blade on said mechanism housing to move into and out of engagement with said line contact member, connecting means between said shaft and switch blade whereby rotation of the former effects the aforesaid movement of the latter, contact means interconnecting said line terminal and said mechanism housing including one or more stationary contact means and one or more movable contact means, an operating arm rotatably mounted on said shaft and connected to said movable contact means, operating spring means interposed between said mechanism housing and said operating arm and biasing said movable contact means to open position, latch means cooperating with said operating arm to hold said movable contact means in closed position against the biasing action of said operating spring means; an operating member fast on said shaft having a trip detent to release said latch means on predetermined movement of said second insulator and therewith said operating member in the switch opening direction, and a reclosing arm engageable with a part of said operating arm on continued movement of said operating member in said switch opening direction to return said operating arm and said movable contact means to closed position while said second insulator continues to be rotated in the switch opening direction to complete opening movement of said switch blade; and an operator having a member mechanically connected to said one end of said second insulator for movement in one direction to trip said contact means, to open said switch blade, to reclosed said contact means, and wind up said operating spring means, and in the opposite direction to close said switch blade.

6. Switch means comprising, in combination, support means; first, second and third insulators mounted on said support means in parallel spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means rotatably mounting said switch blade on said mechanism housing to swing into and out of engagement with said line contact member, connecting means between said shaft and switch blade whereby rotation of the former effects the aforesaid movement of the latter, contact means interconnecting said line terminal and said mechanism housing including one or more stationary contact means and one or more movable contact means, an operating arm rotatably mounted on said shaft and connected to said movable contact means, operating spring means interposed between said mechanism housing and said operating arm and biasing said movable contact means to open position, latch means cooperating with said operating arm to hold said movable contact means in closed position against the biasing action of said operating spring means, a pry out arm rotatably mounted on said shaft and movable in the path of a part of said operating arm, pry out means rotatably mounted on said mechanism housing for operating said pry out arm; an operating member fast on said shaft having a trip detent to release said latch means on predetermined movement of said second insulator and therewith said operating member in the switch opening direction, a pry out detent to operate said pry out means and move said pry out arm to initiate movement of said operating arm and said movable contact means, and a reclosing arm engageable with a part of said operating arm on continued movement of said operating member in said switch opening direction to return said operating arm and said movable contact means to closed position while said second insulator continues to be rotated in the switch opening direction to complete opening movement of said switch blade; and an operator having a member mechanically connected to said one end of said second insulator for movement in one direction to trip said contact means, to open said switch blade, to reclose said contact means, and wind up said operating spring means, and in the opposite direction to close said switch blade.

7. Switch means comprising, in combination, support means; first, second and third insulators mounted on said support means in parallel spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means rotatably mounting said switch blade on said mechanism housing to swing into and out of engagement with said line contact member, connecting means between said shaft and switch blade whereby rotation of the former effects the aforesaid movement of the latter, main and auxiliary contact means in parallel circuit relation and interconnecting said line terminal and said mechanism housing, said main contact means including one or more stationary main contact means and one or more movable main contact means; said auxiliary contact means including one or more stationary auxiliary contact means, and one or more movable auxiliary contact means; a main operating arm rotatably mounted on said shaft and connected to said movable main contact means, operating spring means interposed between said mechanism housing and said main operating arm and biasing said movable main contact means to open position, main latch means cooperating with said main operating arm to hold said movable main contact means in closed position against the biasing action of said operating spring means, an auxiliary operating arm rotatably mounted on said shaft and connected to said movable auxiliary contact means, prestressed auxiliary spring means interconnecting said main and auxiliary operating arms and further stressed as a function of the movement thereof apart, auxiliary latch means cooperating with said auxiliary operating arm to hold said movable auxiliary contact means in closed position against the biasing action of said auxiliary spring means, means for tripping said auxiliary latch means when said movable main contact means has been moved through a predetermined portion of the opening movement thereof, an operating member fast on said shaft having a trip detent to release said main latch means on predetermined movement of said second insulator and therewith said operating member in the switch opening direction, and a reclosing arm engageable with a part of said main operating arm on continued movement of said operating member in said switch opening direction to return said main and auxiliary operating arms and said main and auxiliary movable contact means to closed positions while said second insulator continues to be rotated in the switch opening direction to complete opening movement of said switch blade; and an operator having a member mechanically connected to said one end of said second insulator for movement in one direction to trip said main and auxiliary contact means, to open said switch blade, to reclose said main and auxiliary contact means, and wind up said operating spring means, and in the opposite direction to close said switch blade.

8. Switch means comprising, in combination, support means; first, second and third insulators mounted on said support means in parallel spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means rotatably mounting said switch blade on said mechanism housing to swing into and out of engagement with said line contact member, connecting means between said shaft and switch blade whereby rotation of the former effects the aforesaid movement of the latter, main and auxiliary contact means in parallel circuit relation and interconnecting said line terminal and said mechanism housing, said main contact means including one or more stationary main contact means and one or more movable main contact means; said auxiliary contact means including one or more stationary auxiliary contact means, and one or more movable auxiliary contact means; a main operating arm rotatably mounted on said shaft and connected to said movable main contact means, operating spring means interposed between said mechanism housing and said main operating arm and biasing said movable main contact means to open position, main latch means cooperating with said main operating arm to hold said movable main contact means in closed position against the biasing action of said operating spring means, an auxiliary operating arm rotatably mounted on said shaft and connected to said movable auxiliary contact means, prestressed auxiliary spring means interconnecting said main and auxiliary operating arms and further stressed as a function of the movement thereof apart, auxiliary latch means cooperating with said auxiliary operating arm to hold said movable auxiliary contact means in closed position against the biasing action of said auxiliary spring means, means for tripping said auxiliary latch means when said movable main contact means has been moved through a predetermined portion of the opening movement thereof, a lost motion connection between said main and auxiliary operating arms whereby after said movable main contact means has been moved through said predetermined movement said movable auxiliary contact means is moved conjointly with said movable main contact means as a result of the combined action of said auxiliary and operating spring means and the kinetic energy of said movable main contact means and said main operating arm; an operating member fast on said shaft having a trip detent to release said main latch means on predetermined movement of said second insulator and therewith said operating member in the switch opening direction, and a reclosing arm engageable with a part of said main operating arm on continued movement of said operating member in said switch opening direction to return said main and auxiliary operating arms and said main and auxiliary movable contact means to closed positions while said second insulator continues to be rotated in the switch opening direction to complete opening movement of said switch blade; and an operator having a member mechanically connected to said one end of said second insulator for movement in one direction to trip said main and auxiliary contact means, to open said switch blade, to reclose said main and auxiliary contact means, and wind up said operating spring means, and in the opposite direction to close said switch blade.

9. Switch means comprising, in combination, support means; first, second and third insulators mounted on said support means in parallel spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means rotatably mounting said switch blade on said mechanism housing to swing into and out of engagement said line contact member, connecting means between said shaft and switch blade whereby rotation of the former effects the aforesaid movement of the latter, an insulating housing mechanically interconnecting said line terminal and said mechanism housing and holding the latter stationary on said shaft, main and auxiliary contact means in said insulating housing in parallel circuit relation for interconnecting said line terminal and said mechanism housing, said main contact means including one or more stationary main contact means and one or more movable main contact means; said auxiliary contact means including one or more stationary auxiliary contact means, and one or more movable auxiliary contact means; a main operating arm rotatably mounted on said shaft and connected to said movable main contact means, operating spring means interposed between said mechanism housing and said main operating arm and biasing said movable main contact means to open position, main latch means cooperating with said main operating arm to hold said movable main contact means in closed position against the biasing action of said operating spring means, an auxiliary operating arm rotatably mounted on said shaft and connected to said movable auxiliary contact means, prestressed auxiliary spring means interconnecting said main and auxiliary operating arm and further stressed as a function of the movement thereof apart, auxiliary latch means cooperating with said auxiliary operating arm to hold said movable auxiliary contact means in closed position against the biasing action of said auxiliary spring means, means on said main operating arm for tripping said auxiliary latch means when said movable main contact means has been moved through a predetermined portion of the opening movement thereof, a lost motion connection between said main and auxiliary operating arms whereby after said movable main contact means has been moved through said predetermined movement said movable auxiliary contact means is moved conjointly with said movable main contact means as a result of the combined action of said auxiliary and operating spring means and the kinetic energy of said movable main contact means and said main operating arm; an operating member fast on said shaft having a trip detent to release said main latch means on predetermined movement of said second insulator and therewith said operating member in the switch opening direction, and a reclosing arm engageable with a part of said main operating arm on continued movement of said operating member in said switch opening direction to return said main and auxiliary operating arms and said main and auxiliary movable contact means to closed positions while said second insulator continues to be rotated in the switch opening direction to complete opening movement of said switch blade; and an operator having a member mechanically connected to said one end of said second insulator for movement in one direction to trip said main and auxiliary contact means, to open said switch blade, to reclose said main and auxiliary contact means, and wind up said operating spring means, and in the opposite direction to close said switch blade.

10. Switch means comprising, in combination, support means; first, second and third insulators mounted on said support means in parallel spaced relation; a line contact member carried by said first insulator, a line terminal on said third insulator, means rotatably mounting said second insulator at one end of said support means, a shaft on the other end of said second insulator and rotatable therewith, a metallic mechanism housing on which said shaft is rotatably mounted, a switch blade for engaging said line contact member, means rotatably mounting said switch blade on said mechanism housing to swing toward and away from said line contact member and for rotation about its longitudinal axis to move into and out of high pressure contact engagement with said line contact member, connecting means between said shaft and switch blade whereby rotation of the former effects the aforesaid movement of the latter, an insulating housing mechanically interconnecting said line terminal and said mechanism housing and holding the latter stationary on said shaft, main and auxiliary contact means in said insulating housing in parallel circuit relation for interconnecting said line terminal and said mechanism housing, said main contact means including one or more stationary main contact means and one or more movable main contact means; said auxiliary contact means including one or more stationary auxiliary contact means, and one or more movable auxiliary contact means; a main operating arm rotatably mounted on said shaft and connected to said movable main contact means, operating spring means interposed between said mechanism housing and said main operating arm and biasing said movable main contact means to open position, main latch means cooperating with said main operating arm to hold said movable main contact means in closed position against the biasing action of said operating spring means, an auxiliary operating arm rotatably mounted on said shaft and connected to said movable auxiliary contact means, prestressed auxiliary spring means interconnecting said main and auxiliary operating arms and further stressed as a function of the movement thereof apart, auxiliary latch means cooperating with said auxiliary operating arm to hold said movable auxiliary contact means in closed position against the baising action of said auxiliary spring means, means on said main operating arm for tripping said auxiliary latch means when said movable main contact means has been moved through a predetermined portion of the opening movement thereof, a lost motion connection between said main and auxiliary operating arms whereby after said movable main contact means has been moved through said predetermined movement said movable auxiliary contact means is moved conjointly with said movable main contact means as a result of the combined action of said auxiliary and operating spring means and the kinetic energy of said movable main contact means and said main operating arm, a pry out arm rotatably mounted on said shaft and movable in the path of a part of said main operating arm, pry out means rotatably mounted on said mechanism housing for operating said pry out arm; an operating member fast on said shaft having a trip detent to release said main latch means on predetermined movement of said second insulator and therewith said operating member in the switch opening direction, a pry out detent to operate said pry out means and move said pry out arm to initiate movement of said main operating arm and said movable main contact means, and a reclosing arm engageable with a part of said main operating arm on continued movement of said operating member in said switch opening direction to return said main and auxiliary operating arms and said main and auxiliary movable contact means to closed positions while said second insulator continues to be rotated in the switch opening direction to complete opening movement of said switch blade; an operator having a member mechanically connected to said one end of said second insulator for movement in one direction to trip said main and auxiliary contact means, to open said switch blade, to reclose said main and auxiliary contact means, and wind up said operating spring means, and in the opposite direction to close said switch blade, and a ratchet mechanism cooperating with said member to prevent reverse movement thereof after it has been moved through a predetermined extent until said member has been moved to a position corresponding to the open position of said switch blade with said main and auxiliary contact means reclosed; and one or more additional trip detents and corresponding pry out detents on said operating member to effect the opening of said main and auxiliary contact means on reversal of movement of said switch blade from closing to opening movement thereof in the vicinity of said line contact member and before it is finally moved into high pressure contact engagement therewith.

11. Switch means comprising, in combination, support means; first, second and third insulators mounted on said support means in parallel spaced relation; a line contact member mounted on said first insulator, a line terminal mounted on said third insulator, a mechanism housing mounted on said second insulator, a shaft rotatably mounted on and extending within said mechanism housing, a switch blade for engaging said line contact member, means mounting said switch blade on said second insulator to move into and out of engagement with said line contact member, connecting means between said shaft and switch blade whereby rotation of the former effects the aforesaid movement of the latter, contact means interconnecting said line terminal and said switch blade including one or more stationary contact means and one or more movable contact means, means within said mechanism housing controlled by rotation of said shaft to effect movement of said movable contact means to open position to interrupt the circuit between said line contact and line terminal before said switch blade disengages said line contact and to effect movement of said movable contact means to closed position while said shaft continues to be rotated in the switch opening direction to complete opening movement of said switch blade, and an operator mechanically connected to said shaft for movement in one direction to open said contact means, then open said switch blade and finally reclose said contact means, and in the opposite direction to close said switch blade.

12. The invention as set forth in claim 11 wherein the contact means include main and auxiliary stationary and movable contact means in parallel circuit relation, the main movable contact means are first moved followed by movement of the auxiliary movable contact means to interrupt the circuit between the line contact and line terminal, and the main and auxiliary movable contact means are moved to closed position while the switch blade is being moved to its open position.

13. Switch means comprising, in combination, support means; first, second and third insulators mounted on said support means in parallel spaced relation; a line contact member mounted on said first insulator, a line terminal mounted on said third insulator, a mechanism housing mounted on said second insulator, a shaft rotatably mounted on and extending within said mechanism housing, a switch blade for engaging said line contact member, means mounting said switch blade on said second insulator to move into and out of engagement with said line contact member, connecting means between said shaft and switch blade whereby rotation of the former effects the aforesaid movement of the latter, contact means interconnecting said line terminal and said switch blade including one or more stationary contact means and one or more movable contact means, an operating arm within said mechanism housing rotatably mounted on said shaft and connected to said movable contact means, operating spring means within said mechanism housing interposed between it and said operating arm and biasing said movable contact means to open position, latch means within said mechanism housing cooperating with said operating arm to hold said movable contact means in closed position against the biasing action of said operating spring means, an operating member within said mechanism housing fast on said shaft having a trip detent to release said latch means on predetermined movement of said shaft in the switch opening direction, a reclosing arm within said mechanism housing engageable with a part of said operating arm on continued movement of said operating member in said switch opening direction to return said operating arm and said movable contact means to closed position while said shaft continues to be rotated in the switch opening direction to complete opening movement of said switch blade, and an operator mechanically connected to said shaft for movement in one direction to trip said contact means, to open said switch blade, to reclose said contact means, and to wind up said operating spring, and in the opposite direction to close said switch blade.

14. The invention as set forth in claim 13 wherein the contact means include main and auxiliary stationary and movable contact means in parallel circuit relation, the operating arm is connected to said main movable contact means, an auxiliary operating arm is rotatably mounted on the shaft within the mechanism housing and is connected to said auxiliary movable contact means and is movable following movement of said main movable contact means towards open position to move said auxiliary contact means to open position and interrupt the circuit between the line contact member and line terminal.

15. Switch means comprising, in combination, a line contact member and a line terminal member in insulated spaced relation, a switch blade pivoted at one end for movement into and out of engagement at the other end with said line contact member and having an arcing tip extending endwise of said other end, a pair of arcing horns on said line contact member in staggered relation on opposite sides of said arcing tip when said switch blade is in closed position to facilitate disengagement of said arcing horns by said arcing tip on opening of said switch blade in the event that they should be encased by ice and breaking away ice by contact with said arcing tip on movement of said switch blade toward closed position when said arcing horns are encased by ice, current interrupting means including separable contacts interconnecting said line terminal member and said switch blade, spring means biasing said contacts to open position, latch means holding said contacts closed; operating means connected to said switch blade and to said current interrupting means and operable in one direction for tripping said latch means to permit said spring means to separate said contacts, then moving said switch blade out of contact engagement with said line contact member and said arcing tip out of contact engagement with said arcing horns, and finally reclosing said contacts and recocking said spring means during the final portion of the opening movement of said switch blade, subsequent movement of said operating means in the opposite direction effecting movement of said arcing tip into engagement with said arcing horns and of said switch blade into engagement with said line contact member while said contacts remain closed and said spring means is cocked; means responsive to movement of said operating means in said opposite direction through an extent less than that required to move said arcing tip into full engagement with said arcing horns and then movement of said operating means in said one direction for tripping said latch means to open said contacts before said switch blade is fully closed.

16. Switch means comprising, in combination, a support, a pair of insulators in spaced relation on said support, a line terminal member on one of said insulators, a line contact member on the other insulator, an elongated current interrupter supported at one end on said one insulator and extending toward said other insulator, a metallic mechanism housing at the other end of said current interrupter, said current interrupter including an insulating housing mechanically interconnecting said one insulator and said metallic mechanism housing and at least one pair of separable contacts electrically interconnecting said line terminal member and said metallic mechanism housing, a switch blade rotatably mounted at one end on said metallic mechanism housing for engaging at its other end said line contact member to complete a circuit between said members, operating means for the switch means including an operating shaft extending into and rotatable on said metallic mechanism housing, means controlled by said shaft to open said contacts on rotation of said shaft in one direction and to reclose them on continued rotation of said shaft in the same direction, and means directly mechanically interconnecting said shaft and said switch blade and operating in timed relation to the operation of said contacts for rotating said switch blade out of engagement with said line contact member after said contacts have been opened on rotation of said shaft in said one direction and before they are reclosed and for rotating said switch blade into engagement with said line contact member to complete said circuit on rotation of said shaft in the opposite direction while said contacts remain closed.

17. The invention, as set forth in claim 16, wherein the operating means also includes a manually operable member for rotating the shaft, and ratchet means cooperate with said shaft to prevent rotation thereof in the opposite direction by said manually operable member until the contacts have been reclosed by continued rotation of said shaft in the one direction.

18. The invention, as set forth in claim 16, wherein the current interrupter includes another pair of separable contacts in the housing in parallel circuit relation with the one pair of separable contacts and having a current carrying capacity substantially the same as that of the switch blade, and the operating means includes means for opening said other pair of separable contacts through a predetermined extent by rotation of the shaft in the one direction prior to opening of said one pair of separable contacts and for reclosing said other pair of separable contacts by continued rotation of said shaft in the same direction.

19. The invention, as set forth in claim 16, wherein trip means are positioned within the mechanism housing for effecting the opening of the contacts after the shaft has been rotated in the opposite direction through a predetermined extent to rotate the switch blade toward engagement with the line contact member and then is rotated in the one direction before the rotation of said switch blade into full engagement with said line contact member has been completed.

20. Switch means comprising, in combination, a line contact member and a line terminal member in insulated spaced relation, a switch blade movable into and out of engagement with said line contact member, current interrupting means including separable contacts interconnecting said line terminal member and said switch blade, spring means biasing said contacts to open position, latch means holding said contacts closed; operating means connected to said switch blade and to said current interrupting means and operable in one direction for tripping said latch means to permit said spring means to separate said contacts, then moving said switch blade out of contact engagement with said line contact member, and finally reclosing said contacts and recocking said spring means during the final portion of the opening movement of said switch blade, subsequent movement of said operating means in the opposite direction effecting movement of said switch blade into engagement with said line contact member while said contacts remain closed and said spring means is cocked; and means responsive to movement of said operating means in said opposite direction through an extent less than that required to move said switch blade into full engagement with said line contact member and then movement of said operating means in said one direction for tripping said latch means to open said contacts before said switch blade is fully closed.

21. The invention, as set forth in claim 20, wherein a manually operable member is connected with a ratchet mechanism to the operating means, said ratchet mechanism being arranged to prevent reversal of the operation of said operating means until the contacts have been reclosed and the spring means recocked.

22. Switch means comprising, in combination, support means; first, second and third insulators mounted on said support means in spaced relation; a line contact member carried by said first insulator, a line terminal on said third insulator, means rotatably mounting said second insulator at one end on said support means, a shaft on the other end of said second insulator and rotatable therewith, a metallic mechanism housing on which said shaft is rotatably mounted, a switch blade for engaging said line contact member, means mounting said switch blade on said mechanism housing to move into and out of engagement with said line contact member, connecting means between said shaft and switch blade whereby rotation of the former effects the aforesaid movement of the latter, main and auxiliary contact means in parallel circuit relation and interconnecting said line terminal and said mechanism housing, operating arm means rotatably mounted on said shaft and connected to said main and auxiliary contact means, operating spring means interposed between said mechanism housing and said operating arm means and biasing said main and auxiliary contact means to open position, latch means cooperating with said operating arm means to hold said main and auxiliary contact means closed against the biasing action of said operating spring means, an operating member fast on said shaft having a trip detent to release said latch means on predetermined movement of said second insulator and therewith said operating member in the switch opening direction to open said main contact means first followed by opening of said auxiliary contact means, lost motion connecting means between said main and auxiliary contact means whereby the latter is opened in part due to impact received from the former, a reclosing arm fast on said shaft and engageable with said operating arm means on continued movement of said operating member in said switch opening direction to return said main and auxiliary contact means to closed position while said second insulator continues its rotation in the switch opening direction to complete opening of said switch blade, and an operator having a member mechanically connected to said one end of said second insulator for movement in one direction to trip said main and auxiliary contact means, to open said switch blade, to reclose said main and auxiliary contact means and wind up said operating spring means, and in the opposite direction to close said switch blade.

23. Switch means comprising, in combination, a line contact member and a line terminal member in insulated spaced relation, a switch blade movable into and out of engagement with said line contact member, current interrupting means interconnecting said line terminal member and said switch blade, said current interrupting means comprising sequentially opening main and auxiliary contact means in parallel circuit relation, insulating housing means enclosing said main and auxiliary contact means, spring means for operating said contact means in turn to open position, latch means restraining said spring means, and operating means connected to said switch blade and to said current interrupting means for tripping said latch means to permit said spring means first to separate said main contact means followed by separation of said auxiliary contact means, then moving said switch blade out of contact engagement with said line contact member, and finally reclosing said contacts and winding said spring means to be held by said latch means before said switch blade is reclosed.

24. Switch means comprising, in combination, a line contact member and a line terminal member in insulated spaced relation, a switch blade movable into and out of engagement with said line contact member, current interrupting means interconnecting said line terminal member and said switch blade, said current interrupting means comprising sequentially opening main and auxiliary contact means in parallel circuit relation, insulating housing means enclosing said main and auxiliary contact means, spring means for operating said contact means in turn to open position, latch means restraining said spring means, operating means connected to said switch blade and to said current interrupting means and operable in one direction for tripping said latch means to permit said spring means first to separate said main contact means followed by separation of said auxiliary contact means, then moving said switch blade out of contact engagement with said line contact member, and finally reclosing said contacts and winding said spring means to be held by said latch means before said switch blade is reclosed, subsequent movement of said operating means in the opposite direction effecting movement of said switch blade into engagement with said line contact member while said contacts remain closed and said spring means is cocked; and means responsive to movement of said operating means in said opposite direction through an extent less than that required to move said switch blade into full engagement with said line contact member and then movement of said operating means in said one direction for tripping said latch means to open said contacts before said switch blade is fully closed.

References Cited in the file of this patent

UNITED STATES PATENTS

| | | |
|---|---|---|
| 2,071,157 | Baker | Feb. 16, 1937 |
| 2,164,175 | Frank | June 27, 1937 |
| 2,279,536 | Thommen | Apr. 14, 1942 |
| 2,292,252 | Thommen | Aug. 4, 1942 |
| 2,298,859 | Allan et al. | Oct. 13, 1942 |
| 2,453,555 | Thommen | Nov. 9, 1948 |
| 2,461,846 | Schultz | Feb. 15, 1949 |
| 2,477,781 | Baker et al. | Aug. 2, 1949 |
| 2,522,994 | Coggeshall | Sept. 19, 1950 |
| 2,528,086 | Schenck | Oct. 31, 1950 |
| 2,534,007 | Dietrich | Dec. 12, 1950 |
| 2,555,588 | Gussow | June 5, 1951 |
| 2,658,976 | Hoye | Nov. 10, 1953 |
| 2,679,567 | Kradel | May 25, 1954 |
| 2,710,322 | Price | June 7, 1955 |
| 2,710,897 | Lindell | June 14, 1955 |
| 2,729,721 | Forwald | Jan. 3, 1956 |
| 2,748,226 | MacNeill et al. | May 29, 1956 |
| 2,760,031 | Baker et al. | Aug. 21, 1956 |
| 2,806,110 | Leeds | Sept. 10, 1957 |
| 2,838,636 | Schwager | June 10, 1958 |
| 2,897,323 | Krase et al. | July 28, 1959 |
| 2,955,181 | Luehring | Oct. 4, 1960 |

FOREIGN PATENTS

| | | |
|---|---|---|
| 506,857 | Great Britain | June 6, 1939 |
| 628,728 | Great Britain | Sept. 2, 1949 |